United States Patent
Gao et al.

(10) Patent No.: US 8,452,522 B2
(45) Date of Patent: May 28, 2013

(54) CONTROL METHOD AND DEVICE FOR ENGINE

(75) Inventors: Xiaoqun Gao, Shandong Province (CN); Chunyong Gong, Shandong Province (CN); Hua Zhao, Shandong Province (CN)

(73) Assignee: Shan Dong Shenpu Automobile Control Technology Co., Ltd., Shandong Province (CN)

( * ) Notice: Subject to any disclaimer, the term of this patent is extended or adjusted under 35 U.S.C. 154(b) by 905 days.

(21) Appl. No.: 12/594,754

(22) PCT Filed: Apr. 9, 2008

(86) PCT No.: PCT/CN2008/000721
§ 371 (c)(1),
(2), (4) Date: Oct. 5, 2009

(87) PCT Pub. No.: WO2008/122213
PCT Pub. Date: Oct. 16, 2008

(65) Prior Publication Data
US 2010/0168989 A1 Jul. 1, 2010

(30) Foreign Application Priority Data

Apr. 9, 2007 (CN) .......................... 2007 1 0013975
Dec. 20, 2007 (CN) .......................... 2007 1 0302024
Dec. 20, 2007 (CN) .................... 2007 2 0311050 U

(51) Int. Cl.
*G06F 19/00* (2011.01)
*G06G 7/70* (2006.01)
*F02P 5/00* (2006.01)
*F02M 51/00* (2006.01)
*F02D 41/00* (2006.01)

(52) U.S. Cl.
USPC ....... 701/110; 123/406.33; 123/486; 123/674

(58) Field of Classification Search
USPC ..... 123/406.33, 480, 486, 674; 701/102–105, 701/110, 114, 115
See application file for complete search history.

(56) References Cited

U.S. PATENT DOCUMENTS

| | | | |
|---|---|---|---|
| 4,498,036 A | 2/1985 | Salemka | |
| 4,508,079 A * | 4/1985 | Komurasaki et al. | 123/406.33 |
| 4,697,127 A | 9/1987 | Stich et al. | |
| 5,749,346 A * | 5/1998 | Halvorson et al. | 123/486 |
| 5,854,744 A | 12/1998 | Zeng et al. | |
| 5,984,831 A | 11/1999 | Wadas et al. | |
| 6,113,516 A * | 9/2000 | Janecke | 477/124 |

FOREIGN PATENT DOCUMENTS

JP   2001-1768   9/2001

* cited by examiner

*Primary Examiner* — Stephen K Cronin
*Assistant Examiner* — Sizo Vilakazi
(74) *Attorney, Agent, or Firm* — McDonnell Boehnen Hulbert & Berghoff LLP

(57) ABSTRACT

A control method and a control device of an engine are introduced. During the process of the engine controlling, the control unit does the adaptive learning for the actual target value of the feedback of different aims, and following the dynamic spectrogram generation strategy optimizing compares the adaptively learning parameter of the same working status and the same time with the basic spectrogram parameter. If the compared result doesn't meet the condition, then keep the basic spectrogram parameter. And if it meets the condition, then the engine generates the dynamic spectrogram parameter. Based on the dynamic spectrogram combination strategy, the engine combines the basic spectrogram parameter and the dynamic spectrogram parameter generated to the combined spectrogram parameter instead of the basic spectrogram parameter.

13 Claims, 8 Drawing Sheets

CONTROL METHOD AND DEVICE FOR ENGINE

TECHNICAL FIELD

The present invention relates to a control method and a control device for an engine, which pertains to the technical field of gasoline engine control.

BACKGROUND OF THE INVENTION

Main controls for a vehicle gasoline engine include an ignition control and an injector control.

During a control process, a control unit locates controlled parameter maps according to basic control conditions, corrects them based on the engine conditions reflected by a plural of sensors, outputs them to control a plural of actuators, and thus controls targets. The controls are open-loop controls and closed-loop controls.

An open-loop control of engine ignition timing is mainly based on an engine load signal which is determined by an intake flowrate signal and a throttle valve signal, an engine rotational speed signal and a crankshaft position signal. A closed-loop control of engine ignition timing is, based on feedback signals of knock sensor(s), to adjust an ignition system.

An open-loop control of an injector mainly detects the intake flowrate, calculates the injection time on the basis of the intake flowrate signal and other sensor signals upon different working status, and determines the quantity of gasoline injection, which, in fact, is the control of an air-fuel ratio. An closed-loop control of an injector measures the air-fuel ratio density of a gas mixture in the firebox of the engine based on oxygen content in the exhaust detected by an oxygen sensor. The closed-loop control further gets an error signal after the measured air-fuel ratio density signal is fed back to Engine Control Unit (ECU) and compared with the predetermined target air-fuel ratio, determines an injection pulse width, and keeps the air-fuel ratio near the predetermined target value. Currently, the air-fuel ratio is mostly maintained in a very narrow range near the theoretical air-fuel ratio of 14.7, which, at the sacrifice of partial economical efficiency and partial power characteristics, is to meet the exhaustion requirements for vehicles by employing a three-way catalyst device. In most working status (e.g. engine starting, warm-up, idle, heavy load, acceleration-deceleration), it is necessary to release from the closed-loop controls and enter into the open-loop controls.

Other engine controls include an idle control, an EGR control (exhaust gas recirculation system), an intake control, and others. The intake control is composed of a VTEC control (Variable Valve Timing and Lift Electronic Control System), a turbo charge control, a variable intake pipe length and variable intake manifold length control, a resonator intake inertia control, and others.

The engine idle control is an intake closed-loop control. The exhaust gas recirculation (EGR) control is an open-loop control, the control parameters of which include engine water temperature, intake gas temperature, rotational speed and throttle valve opening. In the intake control, the VTEC control is a mechanical control system, the function of which is to change a fixed valve stroke into a variable valve stroke in correspondence to the rotational speed of the engine. The turbo charge control controls variable intake sections. The variable intake pipe length and variable intake manifold length control and the resonator intake inertia control are pressure-wave inertia supercharging controls utilizing the intake pressure wave characteristic.

The control methods mentioned above are well applicable to the gasoline engine. However, the existing parameter maps control strategies are ineffective in dealing with the following problems:

(1) decreased control accuracy because of manufacture deviation associated with sensors and executable devices, variations in working characteristics due to abrasion and aging after a period of usage, matching deviation due to fittings replacements, and others;

(2) varied loads because of environment and season changes, working mediums changes (such as a machine oil viscosity change), electric appliances and auxiliary power access changes, and different operation of the engine;

(3) deviated measurements caused by measuring instruments and operating means used in optimizing the control unit on an engine testing bench, and other uncertain factors that are unconsidered;

(4) deviated real-time controls caused by signal transfer time lag of the sensors, operation process time lag of the control unit, movement time lag of the executable devices, and others.

The aforementioned problems affect the controlled targets resulting in deviation from the testing bench optimizations for the basic ignition parameter maps, the basic injection parameter maps and other controlled parameter maps. However, due to various time lag effects, one can only partially correct control deviation in correspondence to various condition signals fed back by the sensors, but cannot achieve a complete correction. Consequently, the engine is not able to operate efficiently.

SUMMARY OF THE INVENTION

The technical problem to be solved of the present invention is to provide a strategy, by which the dynamic parameter maps can be adaptively generated according to the change of the engine associated characteristics and the change of the engine usage conditions during a working process, aiming at the existing problems in the current control ways of the gasoline engine; thereby to provide a method and a device, which utilizes the combined parameter maps obtained by combining the dynamic parameter maps with the original basic parameter maps to control the engine.

To achieve the aforementioned object, one embodiment of the present invention provides a control method of the engine, which comprises the following steps: determining current working status via a control unit according to the basic operation conditions and the feature signal values of a plural of sensors, generating expected target values for different targets of the engine under the current working status according to the basic parameter maps, correcting the basic parameter maps according to a correction strategy, and controlling the different targets of the engine; during performing the control method for the engine, the control unit also executes the following steps:

Step S1: adaptively learning the actual target values fed back by the different targets of the engine and performing comparison and judgment for optimization between the adaptively learned actual target values and the basic parameter maps under the same working status and the same basic operation conditions according to a dynamic map generation strategy; wherein, if a condition is not satisfied, the basic parameter maps are kept; and if the condition is satisfied, the dynamic parameter maps are generated, and Step S2: forming combined parameter maps from the basic parameter maps and the dynamic parameter maps according to a dynamic map combination strategy, and replacing the basic parameter maps with the combined parameter maps.

Preferably, the current working status comprises a medium and low load working status, a heavy load working status, a starting working status, an acceleration-deceleration working status and an idle working status.

Preferably, the combined parameter maps comprise combined ignition parameter maps of the engine, combined injection parameter maps of the engine, combined intake parameter maps of the engine, combined idle controlled parameter maps of the engine, combined EGR rate parameter maps, and combined ignition dwell angle parameter maps of the engine.

Preferably, the basic parameters maps comprise the first parameter maps calibrated by an engine testing bench and the second parameter maps calibrated by the engine testing bench and the path parameter optimization.

Preferably, the step that the basic parameter maps are corrected according to the correction strategy includes the following steps: correcting the basic parameter maps using the feature signal values of a plural of associated sensors which reflect the current working status of the engine; correcting the basic parameter maps using soft measuring feature signal values which are obtained by performing a soft measuring method with the new feature signal processing way of the associated sensors on the variables that can't be directly measured; and correcting the basic parameter maps using the feature signal values of the associated sensors which are adaptively learned by performing weighted value matching during the correction step between the expected target values and the actual target values; wherein, the feature signals of the associated sensors include the signals of the associated sensors of the engine and the feature signals deduced using soft measuring way, including a crankshaft position and rotational speed signal of the engine, a top dead center signal, a torque signal, an injection pulse width signal, a throttle valve position signal, an oxygen sensor signal, a fuel temperature signal, a machine oil temperature signal, an environment pressure signal, a power supply loop voltage signal, a water temperature sensor signal, an exhaust temperature signal, an intake pressure signal, an air-fuel ratio signal, a knock signal, a flame conduction angle signal, frequency selection probability distribution of knock signals in several cycles, and probability of a flame transmitting angle signal exceeding time threshold.

Preferably, the step S1 further comprises: generating a set of adaptive parameters according to learning the change of the working status conditions and operation conditions and the change of self factors of the engine, and storing the adaptive parameters temporarily by experiential clustering distinguished from working status and operation conditions; during the control process of different targets of the engine, continuously performing comparison and judgment according to optimization conditions between the basic parameter maps and the temporarily stored adaptively learned parameters under the same working status and the same operation conditions according to the dynamic map generation strategy; wherein, when the temporarily stored adaptively learned parameters match the dynamic map generation strategy, dynamic parameter maps under the working status and the operation conditions are generated, which will be continuously learned in the later control and be continuously updated by performing repeatedly the above process.

Preferably, the step of generating dynamic parameter maps according to the dynamic map generation strategy further comprises:

a. determining a dynamic map generation region: the basic parameter map of a certain control target under the same working status and the same operation conditions and the various associated feature signal values that represent the working status and the operation conditions at the moment are taken as a data node; the corrected basic parameter map y of this node is taken as the central value; and the dynamic map generation region (y−☐y, y+☐y) is generated with the difference between the expected control target value and the actual control target value as the basic reference radius;

b. determining a dynamic map optimization region in the generation region: in the spatial region of the same dimension, the dynamic map generation trend is judged based on the magnitude of the changing rates of the various associated feature signal values representing this working status in this data node to determine whether the smaller region is on the $(y-\Delta y)$ side or on the $(y+\Delta y)$ side; after the determination, the median of the $(y-\Delta y)$ or $(y+\Delta y)$ region is taken as the new node after target approaching, which is taken as the center to determine the new approached dynamic map generation region; this process repeats and continuously approaches the target until the minimum region min(y−☐y, y+☐y) appears as the optimization region;

c. generating a dynamic map: when the various associated feature signal values representing this working status tend to become a constant $\epsilon$ near zero, and the probability distribution of the associated feature signals after performing probability statistic processing is in the allowable range, the median point $y_m$ in min(y−☐y, y+☐y) is determined as the generated dynamic parameter map;

d. determining the dynamic map: the above processes a-c are repeated and experiential clustering is performed; when the changing rates $\epsilon$ of the various associated feature signal values and the probability distributions of the associated feature signals are stable in an allowable changing range, this dynamic parameter map is determined and stored in a ferroelectric memory; at the moment, the various associated feature signal values corresponding to the determined dynamic parameter map are a set of data nodes, and the set of data nodes are working status condition signals to determine the dynamic parameter map;

e. updating the dynamic map: due to the characteristic change of the engine and the usage environment change during the control process, the control targets of the generated dynamic map also change; during the a-d process taken on the composed data nodes, when the changing rates $\epsilon$ of these various associated feature signal values and the probability distributions of the associated feature signals are determined to be out of the allowable changing range, the new dynamic parameter map is regenerated, determined by experiential clustering, and then used to update the unit of the original data nodes addresses.

Preferably, the step S2 further comprises:

a. comparing the basic parameter maps and the generated dynamic parameter maps under the same working status and the same operation conditions or under the same working status and very close operation conditions;

b. setting wholly or partly the dynamic parameter maps as the combined parameter maps of the engine according to the changing rates of the various associated feature signal values when the various associated feature signal values are same while the target parameters are different in the elements composing the data nodes, and shielding the corresponding basic parameter maps; wherein, the step of the dynamic parameter maps being wholly or partly set as the combined parameter maps of the engine according to the changing rates of the various associated feature signal values comprises: abandoning the dynamic parameter maps when the target is controlled by the determined dynamic parameter maps and the changing rates of the various associated feature signal values can't be stable in the allowable region, setting the basic parameter maps under the working status and the operation conditions as the combined parameter maps of the engine, and regenerating the dynamic parameter maps;

c. calculating respectively the changing rates of the different feature signal values according to the value of the previous cycle and the value of the current cycle value when the various associated feature signal values are not all the same while the target parameters are same, comparing the changing rates to take the minimum to judge the optimization, and determining the combined parameter maps which include whole or partial dynamic parameter maps.

Another embodiment of the present invention further provides a control device of an engine according to the above control method for an engine, which includes a microprocessor. The control device of the engine also includes a power detecting and voltage stabilizing circuit, a communication interface CAN, LIN and external diagnosis circuit, a high-power drive circuit, a switching quantity drive circuit and a drive circuit, which are individually connected to the microprocessor. Also, the control device of the engine includes an input conditioning circuit, an input conditioning buffer circuit, analog signal channels and digital signal channels, wherein a portion of analog signals from a plural of sensors are transported to the microprocessor via the input conditioning circuit and the analog signal channels, while the other portion of analog signals from the sensors are transported to the microprocessor via the input conditioning circuit and the digital signal channels, and digital signals from the sensors are transported to the microprocessor via the input conditioning buffer circuit and the digital signal channels. Wherein, the microprocessor determines a current working status according to basic operation conditions, the analog signals and the digital signals; generates expected target values for different targets of the engine under the current working status according to basic parameter maps; and controls the different targets of the engine after the expected target values are corrected by a correction strategy. The control device for the engine further includes a cerebellum model arithmetic controller CMAC and a ferroelectric memory. The ferroelectric memory is connected to the cerebellum model arithmetic controller CMAC, and the cerebellum model arithmetic controller CMAC is connected to the microprocessor. Wherein, the cerebellum model arithmetic controller CMAC is used to learn adaptively actual target values fed back by different targets of the engine during performing the control method, performs comparison and judgment for optimization between the adaptively learned actual target values and the basic parameter maps according to the dynamic map generation strategy, and when a condition is satisfied, generates the new dynamic parameter maps and store them into the ferroelectric memory. Also, the microprocessor forms combined parameter maps from the basic parameter maps and the dynamic parameter maps stored in the ferroelectric memory according to a dynamic map combination strategy, and replaces the basic parameter maps with the combined parameter maps.

Preferably, these analog signals include an intake pressure or intake flowrate signal, a throttle valve position signal, an atmospheric pressure signal, an intake temperature signal, a cooling water temperature signal, an oxygen sensor signal, an environment temperature signal, an accelerator pedal signal and system voltage variation signal. These digital signals include a crankshaft position signal, an injection pulse width signal, a vehicle speed signal, a knock signal, an air-condition requesting signal, a power-assisted steering requesting signal, a neutral gear signal and a headlamp switch signal.

In one aspect, the control system determines the trend of working status change based on the changing rate of the feature signals of the associated sensors of the engine to perform predictive control of the given target values on a portion of the control targets with too much deviation of time lag. Meantime, it also utilizes the adaptive adjusting and learning ability of the cerebellum model arithmetic controller CMAC to reduce or eliminate the errors caused by the signal lags of various aspects with the predictive control target values as a data node.

In another aspect, when compared with the existing techniques, the method of the present invention which controls the engine with the combined maps has the following beneficial effects. Since the combined parameter map control way is adopted, which is combined with adaptive learning method, the effects to the engine due to the change and uncertain change of the controlled system are corrected, thereby, the control precision and speed is improved. Also, the programming and generation of the dynamic parameter maps is used to improve the problem that the control system can not respond when the condition of the engine itself changes. The control is predicted ahead via the strategy of generating the dynamic parameter maps by the adaptive learning control, by which the control lags caused by the various time lag effects are corrected with utmost and the real time characteristic of the control is enhanced.

The aforementioned and other objects, features and advantages will become more apparent from the following description of the preferred embodiments referring to the appended drawings.

Figure 1:
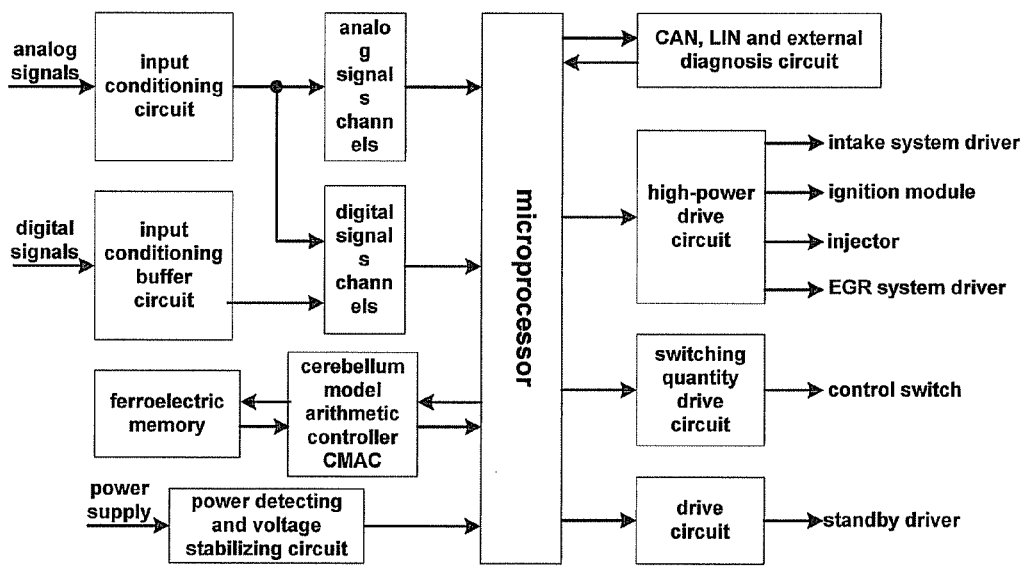
FIG. 1 is a schematic circuit block diagram of a control device of an engine provided by the present invention.

Wherein, the signs in the appended drawings are as following:

1 intake pipe, 2 air cleaner, 3 intake temperature sensor, 4 stable pressure box, 5 intake flow detector, 6 electric throttle valve controller, 7 by-pass pipe, 8 intake by-pass electromagnetic valve, 9 electronic speed control compressor, 10 controller, 11 air jet orifice, 12 assisted stable pressure box, 13 injection chamber, 14 engine, 15 injector, 16 exhaust pipe, 17 oxygen sensor, 18 accelerator pedal position signal, 19 throttle valve torque motor drive signal, 20 accelerator control signal, 21 proportional electromagnetic valve, 22 other sensor signals.

U1 microprocessor, U2 cache, U3 phase locked loop, U4,U6 operational amplifier, U5 logarithmic amplifier, U7 comparator, U8 magnetic converter, U9 operational amplifier, U10 operational amplifier, U11 inverter, U12 gate circuit, U13 CAN communication receiver, U14 asynchronous serial communication processor, U15 electron switch, U16 register, U17,U18 micro-power consumption operational amplifier, U19 phase locked loop, U20 Schmitt trigger, U21 time-base circuit, U22 latch, U23 dynamic storage, U24 microprocessor, U25 storage, U26 extended interface, U27,U28 switching quantity driver, U29 signal amplifier, U30, U31 switching quantity driver, U32 high power drive tube, U33-U38 switching quantity driver, DS 8-seg led, DB9 communication interface, OP1-OP31 photoelectric coupler, M1-M4 injector, T1-T4 positive booster, MG1 stepping motor, MG2 throttle valve motor, DJ1 electromagnetic valve, BT1-BT5 power drive tube, DE3-DE6 zener diode, Q3, Q10, Q11-Q18 power driver, QE1 power driver, R1-R140 resistance, VR1-VR2 variable resistance, C2-C62 capacitance, D1-D12 zener/rectifier diode, Q1-Q2, Q4-Q9 triode, L1-L2 inductance, Y1-Y2 crystal oscillator, DE1-DE2 zener diode.

DETAILED DESCRIPTION OF THE INVENTION

Specific embodiments of the present invention are provided in the following description in detail. It should be noted that the described embodiments are only used for illustration but not to limit the scope of the present invention.

The control method and device for engine by the combined maps presented by the present invention achieve the control functions for the engine by a normal controller (a central control unit ECU) and the cerebellum model arithmetic controller CMAC based on some control strategies, wherein, the control strategies include a correction strategy, a dynamic map generation strategy and a dynamic map combination strategy, and the control functions include an injection control, an ignition (ignition advance angle and ignition dwell angle) control, an intake control, an idle control, a discharge (a carbon canister evaporation, an exhaust gas recirculation system EGR) control and an auxiliary (electric load, power-assisted steering, oil pump, air-conditioner, and others) control. The implementation processes are illustrated in the following.

A control method for an engine comprises the following steps: determining the current working status via the control unit according to the basic operating conditions and the feature signal values of a plural of sensors; generating expected target values for different targets of the engine under the current working status according to the basic parameter maps, correcting the basic parameter maps according to a correction strategy, and controlling the different targets of the engine; during performing the control method for the engine, the control unit also executes the following steps:

Step S1: adaptively learning actual target values fed back by the different targets of the engine and performing comparison and judgment for optimization between the adaptively learned actual target values parameters and the basic parameter maps under the same working status and the same basic operation conditions according to a dynamic map generation strategy; wherein, if the condition is not satisfied, the basic parameter maps are kept; and if the condition is satisfied, the dynamic parameter maps are generated.

Step S2: forming combined parameter maps from the basic parameter maps and the dynamic parameter maps according to the dynamic map combination strategy, and replacing the basic parameter maps with the combined parameter maps.

The working status comprises a medium and low load working status, a heavy load working status, a starting working status, an acceleration-deceleration working status and an idle working status.

The combined parameter maps comprise combined ignition parameter maps of the engine, combined injection parameter maps of the engine, combined intake parameter maps of the engine, combined idle controlled parameter maps of the engine, combined EGR rate parameter maps, and combined ignition dwell angle parameter maps of the engine.

The basic parameter maps comprise the parameter maps calibrated by the engine testing bench and the parameter maps calibrated by the engine testing bench and the path parameter optimization.

Further, the above control method for the engine is described in combination with the control device of the engine shown in FIG. 1. In FIG. 1, the control device for the engine includes a microprocessor. The control device of the engine also includes a power detecting and voltage stabilizing circuit, a communication interface CAN, LIN and external diagnosis circuit, a high-power drive circuit, a switching quantity drive circuit and a drive circuit, which are connected to the microprocessor respectively. Also, a portion of the analog signals from a plural of sensors are connected to the microprocessor via an input conditioning circuit and analog signal channels, while the other portion of the analog signals from a plural of sensors are connected to the microprocessor via an input conditioning circuit and digital signal channels. Digital signals from a plural of sensors are connected to the microprocessor via the input conditioning buffer circuit and the digital signal channels. Wherein, the microprocessor determines a current working status according to basic operation conditions, the analog signals and the digital signals, generates expected target values for different targets of the engine under the current working status according to basic parameter maps, and controls the different targets of the engine after the expected target values are corrected by a correction strategy.

The control device for the engine also includes a cerebellum model arithmetic controller CMAC and a ferroelectric memory. The ferroelectric memory is connected with the cerebellum model arithmetic controller CMAC, and the cerebellum model arithmetic controller CMAC is connected with the microprocessor. Wherein, the cerebellum model arithmetic controller CMAC is used to learn adaptively actual target values fed back by different targets of the engine in the control process, performs comparison and judgment for optimization between the adaptively actual target values learned parameters and the basic parameter maps according to the dynamic map generation strategy, and when the condition is satisfied, generates the new dynamic parameter maps and stores them into the ferroelectric memory. Also, the microprocessor forms combined parameter maps from the basic parameter maps and the dynamic parameter maps stored in the ferroelectric memory according to a dynamic map combination strategy, and replaces the basic parameter maps with the combined parameter maps.

Wherein, the analog signals of the external sensors are input into the microprocessor via the input conditioning circuit. The processing of the analog signals by the input conditioning circuit is divided into two parts: one part is to convert the analog signals to digital signals by the input conditioning circuit and input them into the microprocessor via the digital signal channels; the other part is to input the analog signals into the ND port inside the microprocessor by the input conditioning circuit directly via the analog channels. The analog signals mainly include an intake pressure or intake flowrate signal, a throttle valve position signal, an atmospheric pressure signal, an intake temperature signal, a cooling water temperature signal, an oxygen sensor signal, an environment temperature signal, an accelerator pedal signal, a system voltage variation signal, and others.

The digital signals of the external sensors are converted to the input signals that can be received by the microprocessor via the input conditioning buffer circuit. The function of the input conditioning buffer circuit is to process the amplitude, waveform and interference of the digital signals of the sensors, that is, the filter processing. The digital signals mainly include a crankshaft position signal, an injection pulse width signal, a vehicle speed signal, a knock signal, an air-condition requesting signal, a power-assisted steering requesting signal, a neutral gear signal, a headlamp switch signal, and others.

The voltage signals processed by the power detecting and voltage stabilizing circuit are connected to the microprocessor. The main function of the power detecting and voltage stabilizing circuit is to provide the system with stabilized voltage, to provide the sensors with working power and to provide the RAM with power maintenance. The power detecting and voltage stabilizing circuit is composed of a DC/DC converter, an over-current and over-voltage protector, a voltage variation signal transmitter and an anti-jamming circuit.

The communication interface circuit includes a fault diagnosis interfaces and onboard network interfaces. The onboard network interfaces include communication bus CAN-BUS and communication bus LIN-BUS and general-purpose fault diagnosis standard OBD-II/iso-9141K line. These buses are connected to the meters and body control system, etc. The information intercommunion of the signals of these systems with the microprocessor is kept via the network bus and its bus driver, respectively.

The microprocessor is a 32-bit CPU core, which includes internally strategies and algorithms of general controllers, various maps, data of other related control targets and communication bus processors, etc.

The cerebellum model arithmetic controller CMAC is composed of another 32-bit microprocessor as the core and the external circuits. The CMAC includes internally adaptive learning algorithms and control strategies. A control system core which is constituted by CMAC and the main microprocessor accepts the change of the exterior signals and performs adaptive learning to clustering update the dynamic parameter maps.

The basic system parameter maps are copied by the ferroelectric memory, and that portion of the dynamic parameter maps determined to make the system work stable as required via adaptive learning and participating in the control of the working status are stored in the ferroelectric memory as experimental data. When the microprocessor determines that the system is out of control, the basic parameter maps will be automatically written from the ferroelectric memory to the microprocessor.

The high-power drive circuit employs a special control drive chip and an external circuit to drive injector, ignition module, servo-actuator of the intake system and electromagnetic valve, etc.

The switching quantity drive circuit drives idle valve, injector switch of intake air resonant, fuel pump switch, carbon canister electromagnetic valve switch, ERG electromagnetic valve switch, fault indication-alarm switch, air-conditioner power switch, high and low speed fan switch.

The drive circuit presents 4 standby middle power control drives.

It should be specially explained herein that in order to conveniently distinguish from the new control methods, the traditional processing ways and methods such as the use of PID control strategy are all defined to be executed in the normal controller in the present invention. The normal controller is a part of the control device, while another part of the control device is called the cerebellum model arithmetic controller CMAC.

Figure 2:
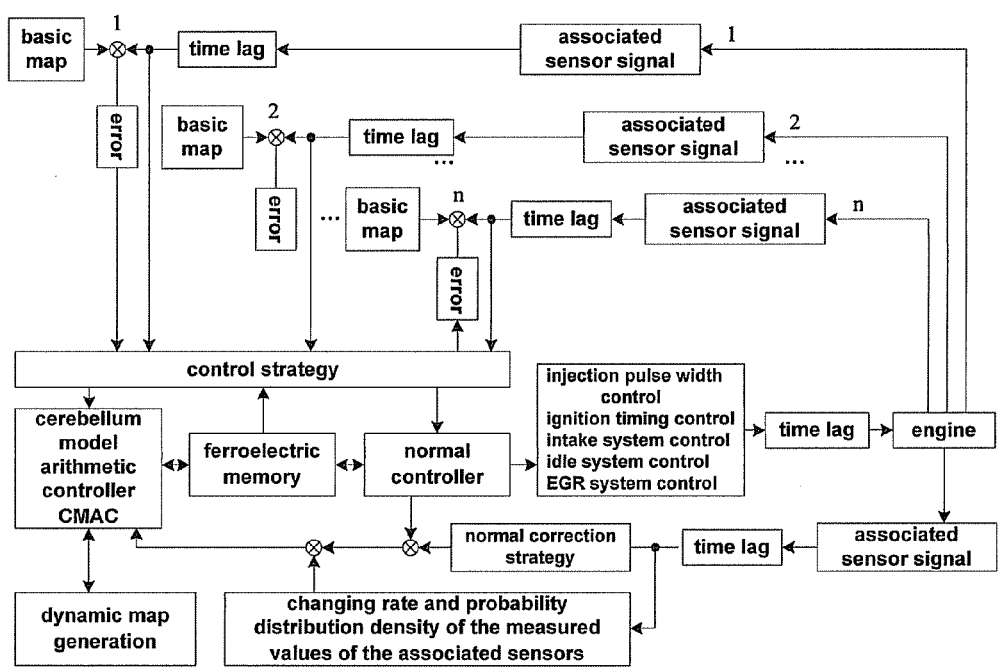
FIG. 2 is a schematic diagram of performing adaptive learning in the control method for an engine provided by the present invention, based on the schematic circuit block diagram shown in FIG. 1.

Based on the above mentioned control device for the engine, the control method for the engine provided by the present invention can be implemented according to the way shown in FIG. 2.

Firstly, control is implemented on different targets by the microprocessor according to the correction strategy.

In common practice, since different basic parameter maps are applied by the microprocessor, for instance, the combination of "1" is used by the cycle injection control, the combination of "2" is used by the ignition timing control, . . . , the combination of "n" is used by the $n^{th}$ control, etc., the different target values will be presented by the various basic parameter maps corresponding to the different working status. Deviations produced between these target values and the actual targets due to the difference of the various usage environment, operation conditions, transfer time lag, machine transfer time lag, characteristics, etc.; the feedback signals deviations to the actual targets due to the characteristics of the sensors, the transfer time lag of the signals, the time lag during the process of signal operation and processing, etc.; the interference produced randomly and the sudden change of the device characteristics due to the interference, etc.; the real-time and the accuracy of the control are affected by the existence of all the above factors. Furthermore, since the basic parameter maps calibrated by the engine testing bench cannot be adjusted in correspondence to the changes, the control targets cannot be precisely determined by the control system.

Once the engine are put into use, except that at the beginning the engine works according to the basic parameter maps calibrated and optimized by the engine testing bench, since the effect of adaptive strategy, the new optimized dynamic parameter maps are adaptively produced continuously. Therefore, for the engine after a period of working, their basic parameter maps have been more or less changed. Even for the engine that are put into use simultaneously and after the same period of working, their basic parameter maps for the same control targets have been changed to no longer the same, which is caused by the manufacture deviation of devices, the fixing industrial art and the difference of the device characteristic itself, the difference of the engine usage environment, the difference of the operation conditions, the difference of the operation method, and others.

To overcome the above shortcomings, the control method for the engine provided by the present invention combines the adaptive control strategy of the traditional PID control and implements control from two aspects: in one aspect, aiming at the deviation of the control targets, adaptive control is performed according to the correction strategy, that is, the adaptive control to ensure the system's stability and the self-corrected adaptive control to assure the control target characteristic optimized (an online recognition system); in another aspect, adaptive learning control is performed via tracing the changing rates of the associated sensor signals of the control targets, that is, the predictive real time control via determining the changing rate of the collected sensor feedback quantity, clustering and approaching the system stability, and self-learning adjusting time lag after the targets are stabilized.

In one aspect, the basic parameter maps corrected according to the conventional correction strategy may comprise: correcting the basic parameter maps using the feature signal values of the associated sensors which reflect the working status of the engine; correcting the basic parameter maps using soft measuring feature signal values which are obtained by performing deduction of a soft measuring method with the new feature signal processing way of the associated sensors on the variables that can't be directly measured; correcting the basic parameter maps are corrected using the feature signal values of the associated sensors which are adaptively learned by performing weighted value matching during the correcting process between the expected target values and the actual target values; wherein, the feature signals of the associated sensors include the signals of the sensors of the engine and the feature signals deduced using soft measuring way, including a crankshaft position and rotational speed signal of the engine, a top dead center signal, a torque signal, an injection pulse width signal, a throttle valve position signal, an oxygen sensor signal, a fuel temperature signal, an oil temperature signal, an environment pressure signal, a power supply loop voltage signal, a water temperature sensor signal, an exhaust temperature signal, an intake pressure signal, an air-fuel ratio signal, a knock signal, a flame transmitting angle signal, frequency selection probability distribution of knock signals in several cycles, and the probability of a flame transmitting angle signal exceeding the time threshold.

In another aspect, the adaptive learning control that is performed via tracing the changing rates of the associated sensor signals of the control targets includes: during the current learning and control stage, the predicted output of the next cycle is determined by the cerebellum model arithmetic controller CMAC in the control system according to the sensor signals of the previous cycle and the changing rates of the corresponding sensor signals. Therefore, the parameter maps of the previous cycle are firstly taken as the center, the input space of the working status is determined according to the changing range of the corresponding sensor signals (for example, the rotational speed) of the previous cycle and the changing rate range of the signals, $Ug=[a, b]\times[c, d]$, the parameter map tracking and correcting space is determined according to the deviation range between the predicted targets and the actual targets and the changing rate range of the deviation, $Um=[e, f]\times[g, h]$, for example, if the stroke of the stepper moter is adjusted from 1 to 1.6 and its changing rate is from 0 to 1, then the standard product space is $Ug=[1, 1.6]\times[0, 1]$. And, the proper quantification class is selected; the initial weight coefficient matrix is presented; the signal changing of the current associated sensors and the changing rate of the signals, the position signals of the current actuators and the changing rates of the signals are taken as a node, the super spatial geometry containing this node is found according to the given sample via selecting the proper parameters and the radius of the spatial geometry, so the matrix S is determined and selected. At this time, the output of the cerebellum model arithmetic controller CMAC is the linear combination of the primary function defined on the super geometry taking the active node as the center, that is, $\hat{y}_t = S_t^T B(x_t) q$, wherein, $B(x_t) = \text{diag}[b_1(x_t), b_2(x_t), \ldots, b_m(x_t)]$, $q = [q_1, q_2, \ldots q_n]^T$ is the vector of weight coefficients, $S_m = [S_{t,m}]_{n \times m}$ is the vector of weight coefficients selection. Thus, for each sample, the weight coefficients only need to be partially adjusted. In this way, after continuous learning and control, the above process is continuously repeated, the dynamic parameter maps meeting the requirement are generated via performing learning and control alternatively to control predictably the sensor signals in the next cycle. After a period of clustering and learning(multi-cycle process), the actual target values are achieved by many times of approximation, therefore, the control deviation caused by the time lag is furthest eliminated, so that the precise control of the engine is achieved.

More particularly, as shown in FIG. 2, the control method and process of the engine provided by the present invention is as the following:

(1) Let $y_j(j=1, 2, 3 \ldots)$ be the controlled output that is the expected control target values of the basic parameter maps; the time $t_i$ of n working cycles of the engine, the rotational speed signal, the throttle valve position signal, the injection pulse width signal, the intake pressure signal, the oxygen sensor signal, the knock signal, the atmosphere pressure signal, the water temperature signal, the fuel temperature signal, the machine oil temperature and machine oil pressure signal, the VNT section opening (with turbo supercharger) and EGR valve opening signal, the voltage signal of storage battery, and the changing rates of the above various signals are continuously measured in the condition applying these expected control target values; the signals of the oxygen sensor and the knock sensor are particularly processed, such as, the target air-fuel ratio control in soft measuring way is performed according to the changing trend of the changing rate of the oxygen sensor feedback quantity, the probability of the occurrence of n cycle knock within 2%-5% is taken as the best ignition adjusting threshold to replace the traditional knock secure angle after the knock sensor signal is treated by the frequency selector and wave detector. Wherein, the value of n is calibrated in the bench test.

The above signals are taken calculation and fitting by the control system with the following formulas:

$$Na_0 + a_1 \sum_{i=1}^{N} t_i - \sum_{i=1}^{N} y_i = 0, \quad a_0 \sum_{i=1}^{N} t_i + a_1 \sum_{i=1}^{N} t_i^2 - \sum_{i=1}^{N} t_i y_i = 0$$

The basic control target $y_i$ is obtained.

In the formulas, $a_0$ is the basic parameter map value or the signal value of the sensor; $a_1$ is the changing rate of the control target or the changing rate of the sensor signal; $t_i$ is the $i^{th}$ cycle time; $y_i$ is the average changing quantity of the control target in the $i^{th}$ cycle.

(2) Fitting is performed on the fitted data again using the formula $$\Delta y = f\left(\frac{d1}{dt}, \frac{d2}{dt}, \ldots, \frac{dn}{dt}\right),$$

wherein, d1/dt, d2/dt, . . . , dn/dt are the changing rates of the associated measured values, respectively. So, the controlled output is changed to $y_j=y_{j-1}+\Delta y$, (j=1, 2, 3 . . . ).

(3) According to the design control logic, when the controlled quantity is determined to be changed from $y_{j-1}$ to $y_j$, for the various measured quantities of the engine, that is, the feature signals of the associated sensors, if their changing rates tend towards to zero, the value tending towards zero, $\epsilon$, is regarded as the optimizing condition. The target value y in this condition is selected as the new control target, and the corresponding condition of lookup table changes.

When $y_j-y_{j-1}>0$, if $b_j-b_{j-1}>\epsilon$, then $y_{j+1}=y_j+\Delta y$ ($\Delta y>0$);

When $y_j-y_{j-1}<0$, if $b_j-b_{j-1}<\epsilon$, then $y_{j+1}=y_j+\Delta y$ ($\Delta y>0$);

When $y_j-y_{j-1}>0$, if $b_j-b_{j-1}<\epsilon$, then $y_{j+1}=y_j-\Delta y$ ($\Delta y>0$);

When $y_j-y_{j-1}<0$, if $b_j-b_{j-1}<\epsilon$, then $y_{j+1}=y_j-\Delta y$ ($\Delta y>0$).

(4) The above process is the adaptive control process of y by taking the measured values of the associated sensors of the engine and their changing vectors as feedback parameters. If the engine operates stably in the n operating cycles of this process (the parameters under various conditions change little, that is, there is $\epsilon$ approaching zero and the probability distribution of the associated feature signals is in the allowable range), the control target y is defined in the geometry region (y−Δy, y+Δy), the space region of the control target is obtained, and control is performed through the continuous approaching to the minimum space region with fixed step interpolation in the region. The various parameters of the engine shown at the moment are namely the optimal parameters of the engine, and the target value under this condition is namely the optimally selected control target.

(5) When the changing trend becomes stable in the n cycles or the optimal condition occurs, the various time lag effects of the microprocessor and the engine are eliminated predicatively by the control strategy according to the learning mode. When the same event happens again, the associated control is performed. When the working status changes or the operation conditions under the same working status change, control is performed again according to the above principle, and the process is repeated in this way.

(6) In the above process, n is determined based on the boundary of stable robustness, the value of $\epsilon$ is a multi-factor associated tiny value constant. The two parameters are repeatedly verified and confirmed by the engine testing bench.

In the above control process of the engine, the corrected basic parameter maps and the signal values of the associated sensors applying these corrected parameters are stored with clustering optimization by the cerebellum model arithmetic controller CMAC. The principles of optimization are divided into two aspects. One aspect is that the optimization region is found out according to the trend of the dynamic parameter map values under the basic working status and the memorized operation status to perform continuously approaching control and determine the data node once the optimal condition $\epsilon$ occurs, thus the space occupation rate is reduced and the generation period of the dynamic parameter maps is shortened. The second aspect is to adopt compact storage strategy for the address space to avoid address redistributed by redundant unit, that is, to adopt unified address modulus operation to get the space for training and storing weights, so that the requirement for hardware implementation is satisfied. The detailed implementation scheme for clustering optimization includes the following steps. The first is to feedback the target location condition of the executing agency in the previous cycle by measuring the various position status signals; the deviation between the actual target value and the output corrected target value and the changing rate of the deviation are calculated and input into the cerebellum model arithmetic controller CMAC by the control system to adaptively correct the weights. The second is to obtain the controlled target model by training and tracking in feedforward way; when the system status is expressed by x(k) and the control vector is expressed by u(k), the control of the executing agency is described as x(k+1)=g[x(k), u(k)]. The third is to calculate the changing rate of the signal values of the sensors associated with the control target by the control system in the specified cycle periods; the changing trend is determined by the changing rate to determine the control direction; the expected output target is predictively given utilizing this changing trend by the control strategy; the weighted value is continuously corrected by the calculation of the deviation between the expected output target and the actually measured target and the changing rate of the deviation; and, the control target is approached according to the stability trend that various changing rates tend to zero.

On the basis of the temporary clustering store of the above adaptive learned parameters, CMAC is used as the controller in the pre-store period of the dynamic parameter maps, that is, the control strategy is executed by the CMAC controller at this stage. When the changing rate of the crankshaft angle acceleration approaches a constant near zero by the optimization via approaching control, the dynamic parameter maps are generated and the control right is transferred to the microprocessor. The detailed steps are as the following:

a. determining the dynamic map generation region: the basic map of a certain control target under the same working status and the same operation conditions and the various associated feature signal values that represent the working status and the operation conditions at the moment are taken as a data node; the corrected basic parameter map y of this node is taken as the central value; and the dynamic map generating region (y−Δy, y+Δy) is generated with the difference between the expected control target and the actual control target as the basic reference radius;

b. determining a dynamic map optimization region in the generation region: in the spatial region of the same dimension, the dynamic map generation trend is judged based on the magnitude of the changing rates of the various associated feature signal values representing this working status in this data node to determine whether the smaller region is on the (y−Δy) side or on the (y+Δy) side; after the determination, the median of the (y−Δy) or (y+Δy) region is taken as the new node after target approaching, which is taken as the center to determine the new approached dynamic map generation region; this process repeats and continuously approaches the target until the minimum region min(y−Δy, y+Δy) appears as the optimization region;

c. generating a dynamic map: when the various associated feature signal values representing this working status tend to become a constant $\epsilon$ near zero, and the probability distribution of the associated feature signals after performing probability statistic processing is in the allowable range, the median point $y_m$ in min(y−Δy, y+Δy) is determined and sent to the temporary storage as the generated dynamic parameter map for using as the output of the control target; the previous process is repeated, including that the various associated changing rates in the previous cycle are continuously calculated, control and learning are performed in the current cycle, and predictive output is performed in the next cycle; at this stage, learning and control are alternatively performed, and the latter is also completed by the cerebellum model arithmetic controller CMAC;

d. determining the dynamic map: the above processes a-c are repeated and experiential clustering is performed; when the changing rates $\epsilon$ of the various associated feature signal values and the probability distribution of the associated feature signals are stable in an allowable changing range, that is, when a stable threshold occurs, this dynamic parameter map of the predictive control targets, namely t the determined dynamic parameter map, is stored in the ferroelectric memory; when the stable threshold occurs, the signal values of the sensors are a set of data nodes and are determined as the working status signals to determine the output of this dynamic parameter map, and constitute the data node with the controlled targets together; by now, the cerebellum model arithmetic controller CMAC returns to the adaptive learning status and the different targets of the engine are controlled by the microprocessor according to the control strategy;

e. updating the dynamic map: due to the characteristics change of the engine and the usage environment change during the control process, the control targets of the generated dynamic map also change; during the a-d process taken on the composed data node, when the changing rates $\epsilon$ of these various associated feature signal values and the probability distribution of the associated feature signals are determined to be out of the allowable changing range, the new dynamic parameter map is regenerated, determined by experiential clustering, and then used to update the unit of the original data nodes addresses.

Figure 3A:
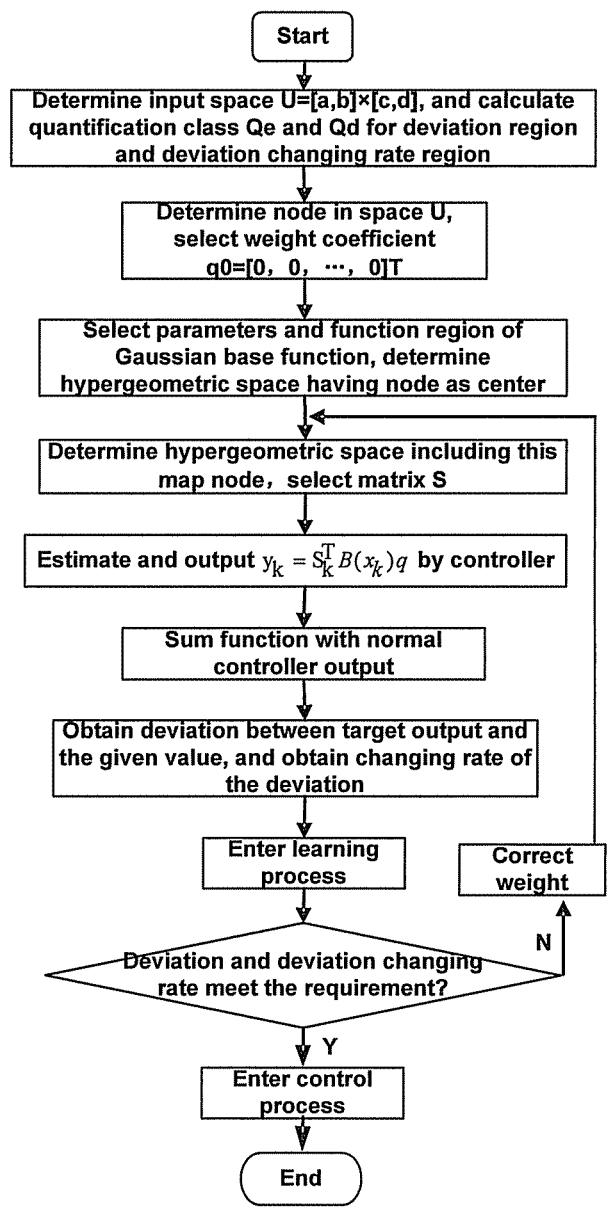
FIG. 3A is a control flow diagram of a cerebellum model arithmetic controller CMAC.

In the above processes, the operation process of the temporary experiential clustering store performed for the adaptive parameters according to the working status and the operation condition and the dynamic map generation are controlled by the cerebellum model arithmetic controller CMAC is shown as FIG. 3A.

Figure 3B:
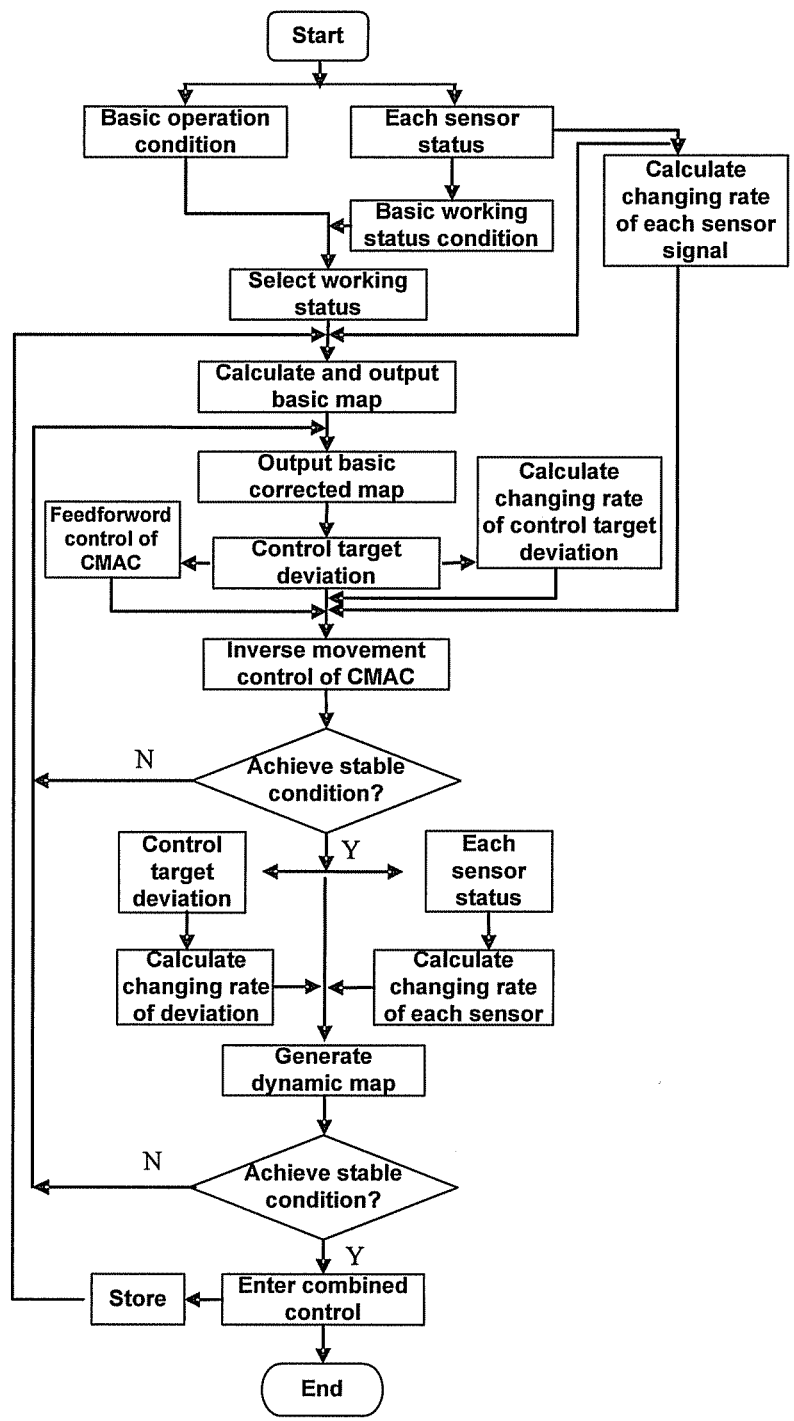
FIG. 3B is a whole flow diagram of a control method for an engine provided by the present invention.

It also can be seen that in the control process of the engine, the control right for the engine is alternatively changed between the microprocessor and the cerebellum model arithmetic controller CMAC continually, so that the update and combination control of the dynamic parameter maps are performed, as shown in FIG. 3B. When the engine begins working, the current working status category of the engine is determined by the control system according to the different operation conditions and the status signals of a plural of sensors, that is, the current basic working status of the determined working status by the control system is formed by the basic operation conditions and the status of the current associated sensors. The current working status is determined by the control system according to the above conditions. The basic parameter maps under this working status are calculated and output. In this process, if the dynamic parameter maps generated by adaptive learning exist, comparison and judgment for stability optimization is performed by the control system. If these dynamic parameter maps are better than the basic parameter maps, these dynamic parameter maps are output. In other word, the combined parameter maps are formed from the basic parameter maps and the generated dynamic parameter maps according to the dynamic map combination strategy; the basic parameter maps are replaced by the combined parameter maps to perform the control of the engine, which includes the following steps: a. comparing the basic parameter maps and the generated dynamic parameter maps under the same working status and the same operation conditions or under the same working status and very close operation conditions; b. setting wholly or partly the dynamic parameter maps as the combined parameter maps of the engine according to the changing rates of various associated feature signal values when the various associated feature signal values are same while the target parameters are different in the elements composing the data nodes, and shielding the corresponding basic parameter maps; wherein, the step of the dynamic parameter maps being wholly or partly set as the combined parameter maps of the engine according to the changing rates of the various associated feature signal values comprises: abandoning the dynamic parameter maps when the target is controlled by the determined dynamic parameter maps and the changing rates of various associated feature signal values can't be stable in the allowable region, setting the basic parameter maps under the working status and the operation conditions as the combined parameter maps of the engine, and regenerating the dynamic parameter maps; c. calculating respectively the changing rates of the different feature signal values according to the value of the previous cycle and the value of the current cycle value when the various associated feature signal values are not all the same while the target parameters are same, comparing the changing rates to take the minimum to judge the optimization, and determining the combined parameter maps which include whole or partial dynamic parameter maps.

These combined parameter maps are corrected by the feedback signals of the sensors as the new basic parameter maps. The actuators are controlled by the corrected combined parameter maps, respectively. For example, the injector is controlled to decide the injection pulse width so as to change the air-fuel ratio, the ignition module is controlled to decide the ignition timing, the idle valve is controlled to decide the idle rotational speed, the intake system is controlled to adjust the intake filling quantity coefficient and the air-fuel ratio, the EGR valve is controlled to improve the exhaust, etc.

In the following description, taking different combined parameter maps for example, the control method for the engine provided by the present invention is described in detail.

Figure 4:
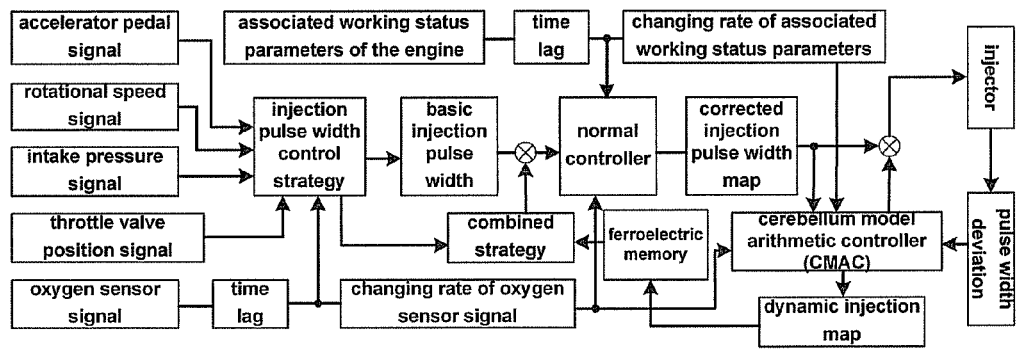
FIG. 4 is a schematic diagram of an embodiment of applying the combined injection parameter maps to perform the injection pulse width control of the engine in the method shown in FIG. 3.

As shown in FIG. 4, an embodiment of performing injection pulse width control of the engine with applying injection combined parameter map is described. The basic parameter map is given by the control system based on the injection pulse width control strategy according to the rotational speed signal, the intake pressure signal, and the throttle valve position signal reflecting the operation status. The control strategy of this basic injection parameter map in the closed-loop control system status is also adjusted by the feedback signal of the oxygen sensor, and is matched by the combined control strategy.

Since the associated working status parameters of the engine (such as, the cooling water temperature, the fuel temperature, the intake gas temperature) are fed back, the normal controller is controlled by the system based on the requirement of different working status, to correct the basic injection parameter map according to the working status parameters. The corrected basic injection parameter map is provided to the cerebellum model arithmetic controller CMAC and the injector. The cerebellum model arithmetic controller CMAC adaptively learns and tracks the corrected control targets of the injector (parameter map), and generates the dynamic injection pulse width parameter map based on the changing rates of the associated working status parameters of the engine, the changing rate of the oxygen sensor signal, the injection pulse width deviation and the changing rate of the deviation according to the method provided in FIG. 2 and FIG. 3. After this dynamic parameter map is determined by optimization condition, it is written into the ferroelectric memory. When the combined parameter map strategy is determined to be applied by judgment and comparison of the injection pulse width control strategy, the adaptive injection pulse width control on the injector of the engine is performed by the combined control parameter map which is composed of the dynamic injection pulse width parameter map and the basic injection parameter map under the combined control strategy.

Furthermore, the single target optimization direction is fuzzy determined under the current working status of the engine by the control system according to the above working status parameters, that is, the power target, the economical target and the normal target. Once the optimization target is chosen, the air-fuel ratio target (that is, the injection pulse width is given or the air-fuel ratio is given by performing double-factor joint adjustment in soft measurement and fixed mixing ratio on the injection pulse width and the intake quantity) will be given by the control system to perform the predictive closed-loop control.

The control system determines the predictive closed-loop control and the predictive control via judging the trend according to the changing direction of the changing rate of the oxygen sensor signal. Thus, the effect of the time lag will be reduced to the minimum to great degree. The disturbance caused by the time lag is deviation elimination and anti-jamming processed by the cerebellum model arithmetic controller CMAC, which aims to make the controlled air-fuel ratio target to trace the expected (predicted) air-fuel ratio according to the expected dynamic characteristic, so as to make the system to achieve a stable precise control.

Figure 5:
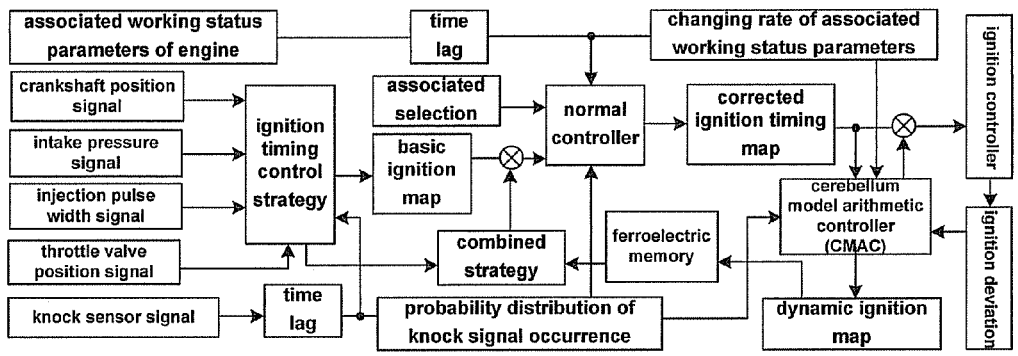
FIG. 5 is a schematic diagram of an embodiment of applying the combined ignition parameter maps to perform the ignition timing control of the engine in the method shown in FIG. 3.

As shown in FIG. 5, an embodiment of performing ignition timing control of the engine with applying ignition combined parameter map is described. The basic ignition timing parameter map is given by the control system based on the basic ignition timing parameter maps according to the crankshaft position signal reflecting the rotational speed and the top dead center position, the intake pressure signal reflecting the load size, the injection pulse width signal reflecting the air-fuel ration condition, the throttle valve position signal reflecting the operation intention and the multi-factor correlation among these signals.

Since the associated working status parameters aiming at the ignition timing control is a multi-factor associated process in the control system, the ignition timing is influenced by the rotational speed, the load, the air-fuel ratio, the cooling water temperature, the compression ratio, the intake gas pressure, the fuel octane number, the turbulence level of the mixing gas, the EGR rate and the shape of the firebox in the engine. When the control is implemented, the working status parameters associated with the ignition timing of the engine and the knock signal during the closed-loop control is collected by the control system; if necessary, probability statistic processing is performed on the flame signal angle (the flame ionization sensor signal) for better effect because this sensor may represent the burning process, that is to say, this sensor determines the arriving time of the flame front; the spreading speed of the laminar flame is calculated utilizing the turbulence, the statistical theory of combustion science and the soft measurement processing function of the cerebellum model arithmetic controller CMAC; thereby, the burning sustaining angle is calculated to adaptively correct the ignition timing parameter map. It should be specially explained that the above associated factors are the basic condition of the basic ignition timing parameter map. The basic ignition timing parameter map is divided into the economic performance, the dynamical performance, the emission performance and the integrity performance distinguished by the ignition control strategy according to the working status and the operation conditions, which is adaptively selected during the control process.

The basic ignition timing parameter map is corrected and output by the normal controller through collecting the working status parameters associated with the ignition timing. The correction is affected by an associated selecting switch, which is set aiming at the octane number and the compression ratio of the fuel since the burning rate is also different if the octane number is different and the flame spreading distance and spreading time is different if the compression ratio is different. Wherein, the selection of the octane number is determined according to the probability density of the knock signal in the unit time or the accelerations of the flame conduction angle signal and the crankshaft position signal; the selection of the compression ratio is a determined influence constant by the bench test according to the different compression ratios of the different engines. What should be specially explained is the function of the combined parameter map control strategy to the ignition timing parameter map of the input normal controller. Under the combined parameter map control strategy, the suitable dynamic parameter map judged by the control, that is, the dynamic parameter map when all the conditions are matched, which is determined to make the engine in the most stable status under the conditions, may wholly or partly replace the original basic ignition timing parameter map calibrated by the engine testing bench. At this moment, the dynamic parameter map under this working status and this operation conditions in the ferroelectric memory is directly sent into the normal controller based on the ignition timing control strategy through the combined control strategy. The corrected ignition timing parameter map is corrected and output by the normal controller to drive the ignition control module to control the ignition of the spark plug.

The cerebellum model arithmetic controller CMAC adaptively learns and tracks the corrected control targets of the ignition module (parameter map), and generates the dynamic ignition timing parameter map based on the changing rates of the associated working status parameters of the engine, the probability density distribution of the knock sensor signal, the changing rate of the intake pressure, the changing rate of the injection pulse width, the changing rate of the throttle valve position, the acceleration of the crankshaft angle, the deviation of the firing delay angle and the burning sustaining angle and the changing rate of the deviation according to the method provided in FIG. 2 and FIG. 3. After this dynamic parameter map is determined by optimization condition, it is written into the ferroelectric memory. When the combined parameter map strategy is determined to be applied by judgment and comparison of the ignition timing control strategy, the adaptive ignition timing control on the ignition control module of the engine is performed by the combined control parameter map which is composed of the dynamic ignition timing parameter map and the basic ignition timing parameter map under the combined control strategy.

For the adaptive ignition timing control, the function of the flame conduction angle signal is synthesized (including performing threshold probability detection and performing converged processing with the knock sensor signal). For example, the best ignition adjusting target threshold is the probability of the occurrence of n cycle knock within 2%-5% after the knock sensor signal is treated by the frequency selector and wave detector. If the probability of the occurrence of the knock exceeds this threshold, the ignition angle will be delayed. In this region, the signals of the associated sensors are determined as the best conditions of this dynamic ignition parameter map through clustering judgment. When part of the conditions change, this threshold being taken as the expected target, learning and control is continuously preformed by the cerebellum model arithmetic controller CMAC so as to replace the traditional knock safe angle distance.

Figure 6:
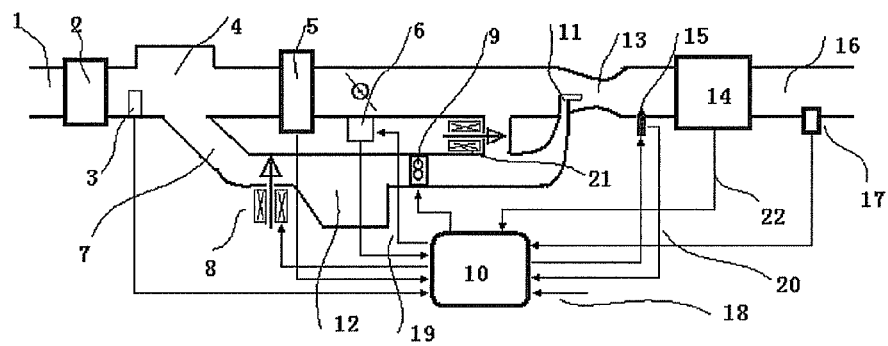
FIG. 6 is a schematic diagram of an embodiment of applying the combined intake parameter maps to perform the intake control of the engine in the method shown in FIG. 3.

As shown in FIG. 6, an embodiment of performing intake control of the engine with applying intake combined parameter map is described. The intake gas of the engine goes through the intake pipe 1, the air cleaner 2, the stable pressure box 4, the intake flow detector 5, the electric throttle valve controller 6 and the injection chamber 13, and enters into the engine 14 via the intake manifold. When the air-fuel ratio target is forcibly adjusted, the intake gas from the intake pipe 1 and the air cleaner 2 to the stable pressure box 4 also enters into the assisted stable pressure box 12 through the by-pass pipe 7, the intake by-pass electromagnetic valve 8, and goes through the electronic-speed control compressor 9, the proportional electromagnetic valve 21 or the air jet orifice 11, enters into the engine 14 via the injection chamber 13 and the intake manifold.

In the implementation process, the intake system executors, such as the intake by-pass electromagnetic valve 8, the electronic-speed control compressor 9 and the proportional electromagnetic valve 21, are controlled by the controller 10 according to the signal of the intake temperature sensor 3, the accelerator pedal position signal 18, the position signal of the electric throttle valve controller 6, the injection pulse width signal of the injector 15, the signal of the oxygen sensor 17 and other intake associated status signals 22 from the engine 14 (such as, the rotational speed signal, the intake pressure signal, the water temperature signal, the flame conduction angle signal) to perform the intake control on the engine 14.

The control mechanism is: In the first aspect, the intake flow detector 5 and the electric throttle valve controller 6 are bypassed for a part of the intake gas under the gas path of the by-pass pipe 7. The air-fuel ratio is forcibly adjusted since an amount of air goes through this path under the function of the electronic-speed control compressor 9, the proportional electromagnetic valve 21, the air jet orifice 11 and the injection chamber 13, so that the intake gas obtains the compensation control. In the second aspect, since the stable pressure box 4 and the assisted stable pressure box 12 are used and their combination is used in parallel with different extent under different working status conditions, the effect of the pressure-wave supercharging is changed and the noise caused by the electronic-speed control compressor and the intake system is reduced because the stable pressure box has the effect of the Helmholtz resonator so that the adjustment function of the magnitude and phase of the pressure wave of the intake gas in the intake pipe is achieved by the stable pressure box 4. In the third aspect, the vortex intensity of the gas flow entering into the intake manifold is adjusted under the function of the electronic-speed control compressor 9, the air jet orifice 11, the injection chamber 13 and the proportional electromagnetic valve 21, which is of benefit to the atomizing and burning of the fuel.

In the control process, according to the above associated control signals and the accelerator control signal 20, the control signal of the intake by-pass electromagnetic valve 8, the controlled map of the electric throttle valve controller 6, the controlled map of the electronic-speed control compressor 9, the controlled map of the proportional electromagnetic valve 21 are output by the controller 10. The above output signals and the output maps are corrected and output by the normal controller of the controller 10 according to the position sensor signal of the electric throttle valve controller 6, the injection pulse width signal of the injector 15, the signal of the oxygen sensor 17 and other signals such as the intake pressure signal, temperature signal and water temperature signal. The output process is adaptively tracked and learned by the cerebellum model arithmetic controller CMAC of the controller 10. The cerebellum model arithmetic controller CMAC performs the control and learning process shown from FIG. 1 to FIG. 3 according to the crankshaft position acceleration, the changing rate of the injection pulse width, the signal changing rate of the oxygen sensor 17, the changing rate of the intake pressure and the intake flow. When the dynamic controlled map is generated, the controller 10 outputs the combined map according to the internal control strategy and the combined control strategy to control the above executors.

Figure 7:
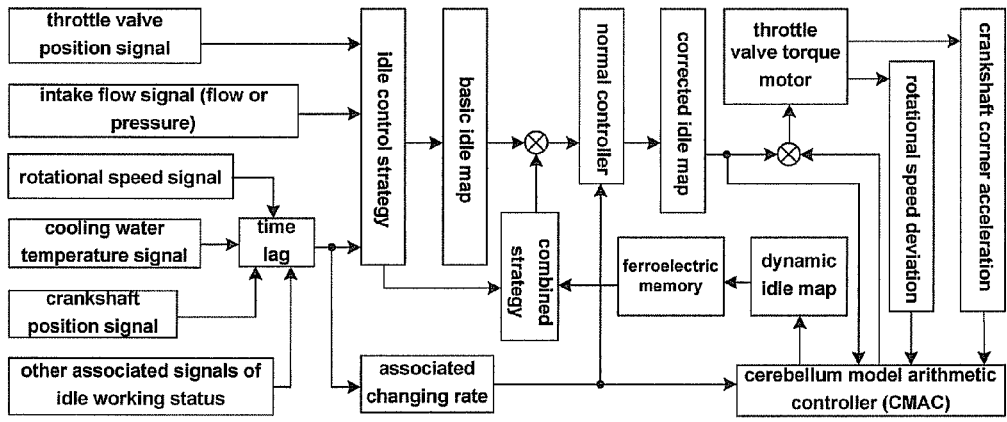
FIG. 7 is a schematic diagram of an embodiment of applying the combined idle controlled parameter maps to perform the idle control of the engine in the method shown in FIG. 3.

As shown in FIG. 7, an embodiment of performing idle control of the engine with applying idle control combined parameter map is described. In this embodiment, the closed-loop control is implemented on the electric throttle valve based on the combined parameter map control method to stabilize the throttle opening in a relatively fixed idle position.

The basic parameter map of the throttle valve torque motor calibrated by the engine testing bench is searched and fetched by the control system according to the control strategy based on the idle working status signal of the engine, that is, the throttle valve position signal, the intake flow signal, the rotational speed signal, the cooling water temperature signal, the injection pulse width signal and other associated signals such as the atmosphere pressure signal, the intake temperature signal. The basic parameter map is corrected and output by the normal controller to control the movement of the throttle valve torque motor.

The idle PID fuzzy control strategy is built in the normal controller. The basic parameter map is corrected and output by using the various status parameters of the engine under the idle working status such as the cooling water temperature and the atmosphere pressure, etc, by using the changing rates and deviations of the associated status parameters in the previous working cycle such as the deviation of the crankshaft corner acceleration and the rotational speed, and by using the switch status of the various assisted electric appliances such as the air conditioner switch.

The cerebellum model arithmetic controller CMAC adaptively learns and tracks the basic output parameter map which controls the throttle valve torque motor, generates and temporarily clustering stores the corresponding dynamic parameter map according to the control strategy. When the most stable working status condition of the engine under the idle working status occurs, the dynamic parameter map and the stable condition are determined after the repeated verification, determination, comparison, continuous participation in correcting, clustering and associating in several cycles with the combined control strategy participating in the control of the control target. The determined dynamic parameter map is stored in the ferroelectric memory to replace the basic idle parameter map to control the target.

When the device characteristics and the usage environment change, the above process is repeated to perform the control. When the load abruptly changes, the predictive control is performed by the control system according to the clustering experience of associating, memorizing and learning with full consideration of the transfer time lag effect of the various status signals of the engine. And the trend of the changing rates of the working status signals is determined in several cycles so as to adaptive learn the status as quickly as possible to temporarily clustering store. When the similar condition happens continuously, the dynamic parameter map is generated via adaptive tracking, adjusting and correcting. When the similar condition happens randomly, the dynamic parameter map and the working status conditions during the abrupt changing are clustering memorized and generated, so that the predictive control is performed when the similar condition happens again.

Figure 8:
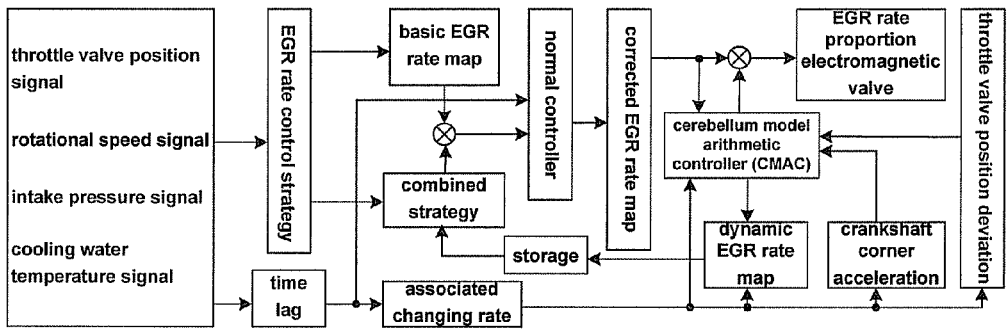
FIG. 8 is a schematic diagram of an embodiment of applying the combined EGR rate parameter maps to perform the ERG rate control of the engine in the method shown in FIG. 3.

As shown in FIG. 8, an embodiment of performing EGR rate control of the engine with applying EGR rate combined parameter map is described. In FIG. 8, the control requirement is as following: the EGR rate is applied on condition of partial load, the EGR rate is zero on condition of full load and the throttle valve opening below 20%,the control region of the EGR rate is 5%-25%.

In the control process, the basic EGR rate parameter map is found out by the control system according to the EGR rate control strategy based on the throttle valve position signal and the rotational speed signal measured by the crankshaft position sensor. The current working status is determined by the normal controller according to the throttle valve position signal, the rotational speed signal, the intake pressure signal and the cooling water temperature signal. For the working status in accordance with the EGR rate control requirement, the EGR rate parameter map is adjusted and corrected according to the signals of the associated sensors under this working status, and after that, the corrected EGR rate parameter map is output to control the operation of the EGR rate proportion electromagnetic valve.

The cerebellum model arithmetic controller CMAC adaptively tracks and learns the corrected EGR rate parameter map which controls the EGR rate proportion electromagnetic valve. It should be specially explained herein that the cerebellum model arithmetic controller CMAC perform soft measure way utilizing the deviation of the throttle valve position and the change of the crankshaft corner acceleration to control and correct putatively the EGR rate, so that the EGR rate is best matched adaptively in the region of 5%-25%. Another function of the cerebellum model arithmetic controller CMAC is to generate the dynamic parameter map via adaptive learning based on the adaptive control strategy and the dynamic parameter map generation strategy in above description in the present invention. When this dynamic parameter map is suitable for controlling the target after judgment and comparison, the basic EGR rate parameter map is wholly or partly replaced according to the combined parameter map control strategy. The above process is repeated.

Figure 9:
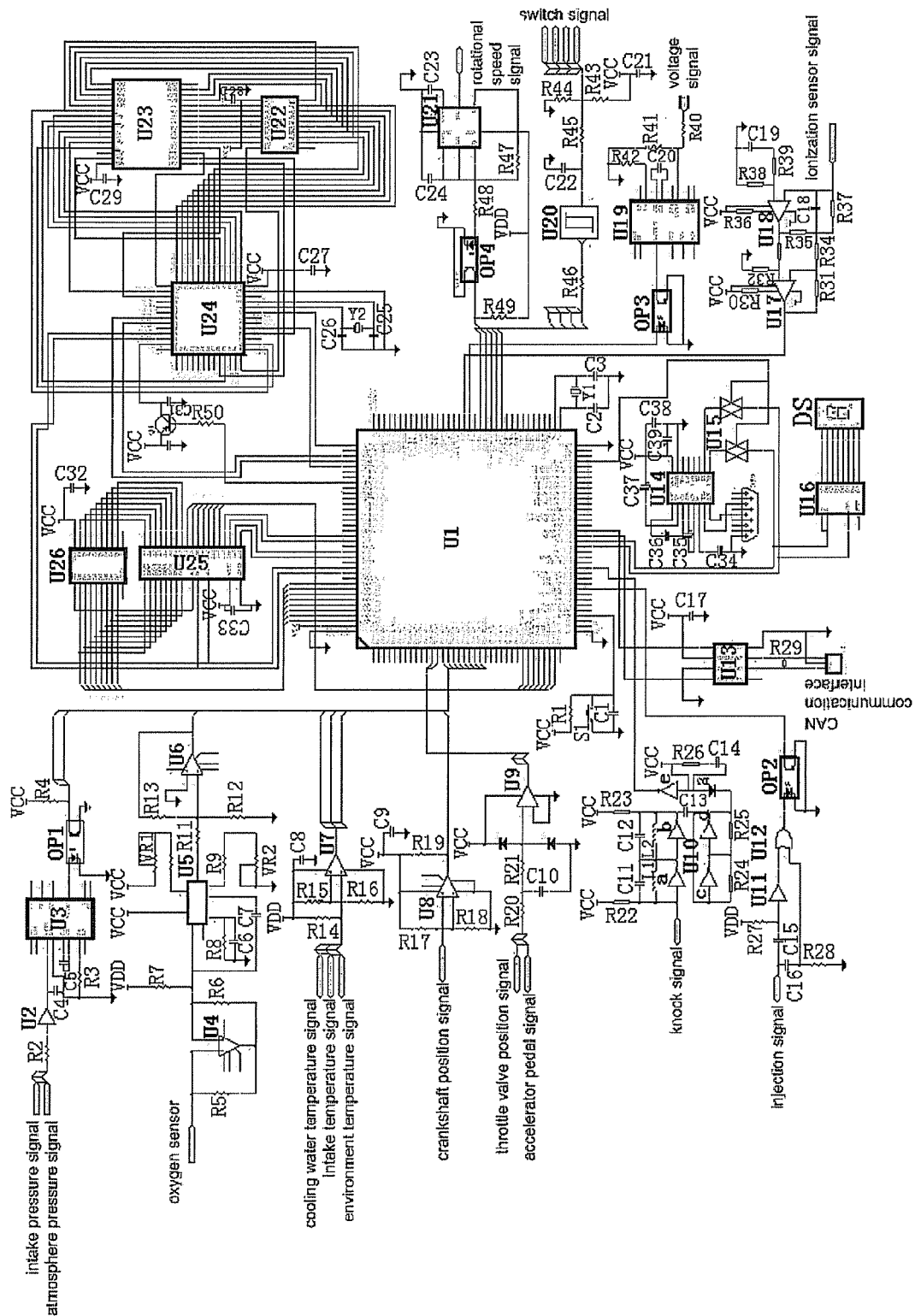
FIG. 9 is a circuit diagram of the embodiment associated with sensors in a control device for an engine provided by the present invention.
Figure 10:
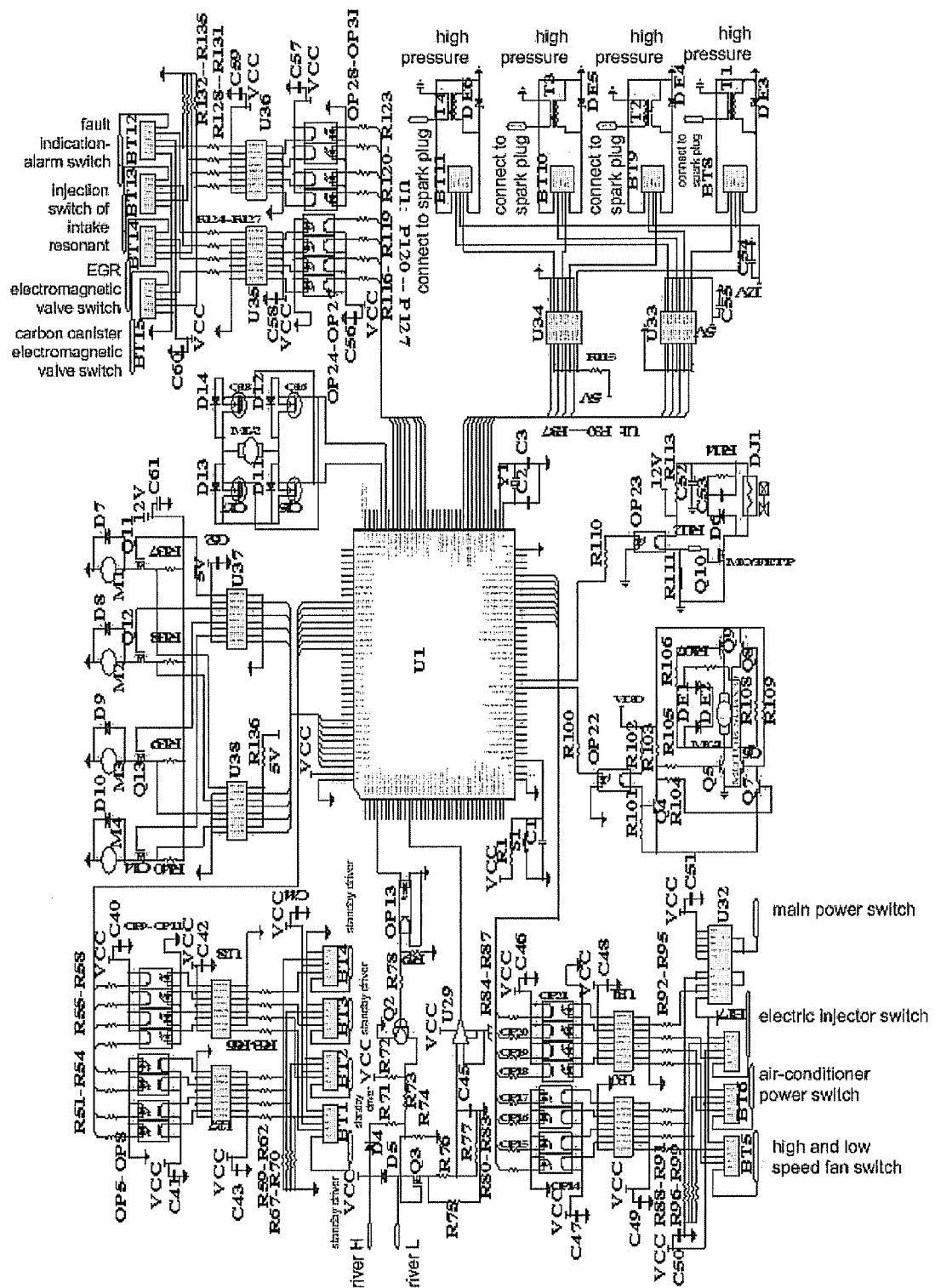
FIG. 10 is a circuit diagram of the embodiment associated with drivers in a control device for an engine provided by the present invention.

Correspondingly, the control device for the engine provided by the present invention can be implemented by the detailed circuit shown in FIG. 9 and FIG. 10.

Wherein, FIG. 9 is the circuit of the embodiment associated with the sensors in the control device for the engine provided by the present invention. The pins 31, 32 of the microprocessor U1 are connected to the pins 29, 24 of the register U16, respectively. The pin 40 of the microprocessor U1 is connected to the high level of VCC via the resistance R1, to the ground via the capacitance C1, and to the ground via the switch S1. The crystal oscillator Y1 is connected between the pin 73 and pin 74 of the microprocessor U1, and is connected to the ground via the capacitance C2 and C3.

The signals of the intake pressure sensor and the atmosphere pressure sensor are entered into the phase locked loop U3 via the cache U2, and the V/F conversion processing is performed. After that, they are input to the pin 50, pin 51 of the ND port of the microprocessor U1 via the photoelectric coupler OP1, so that they can be collected, analyzed and calculated by the microprocessor U1.

The oxygen sensor signal is input into the logarithmic amplifier U5 after being amplified 10 times by the operational amplifier U4. After being amplified by the logarithmic amplifier U5, it is output from the pin 10 of the logarithmic amplifier U5, and it is input into the pin P52 of the ND port of the microprocessor U1 after being I-V converted to a 5-0V voltage signal by the operational amplifier U6, so that the air-fuel ratio can be analyzed and determined by the microprocessor U1.

The cooling water temperature signal, the intake temperature signal and the environment temperature signal are converted to the analog voltage signal by the series divider resistance to supply for the comparator U7 to perform comparison and judgment. Digital signals output in turn by the comparator U7 are input to the pin P54, P55 and P56 of the ND port of the microprocessor U1, so that the working status of the engine can be analyzed and determined by the microprocessor U1.

After the crankshaft position sensor signal is input into the magnetic converter U8 to be converted, it is input into the pin P57 of the ND port of the microprocessor U1, so that it can be analyzed and calculated by the microprocessor U1.

After the throttle valve position signal and the accelerator pedal signal are input into the operational amplifier U9 to be amplified after voltage reduction, they are input into the pin P46 and P47 of the ND port of the microprocessor U1, so that they can be analyzed and calculated by the microprocessor U1.

After the knock signal is amplified by the signal frequency selection and amplification circuit composed of the operational amplifier U10 and its external circuit, it is input into the detection circuit composed of the operational amplifier U10E. The output signal of the detector is input into the pin P16 of the microprocessor U1 after buffered by a NOT gate, so that it can be analyzed and calculated by the microprocessor U1.

The injection signal pulse width detection circuit is composed of the inverter U11 and the gate circuit U12. The injection signal is input into the pin P01 of the INTP0 port of the microprocessor U1, so that it can be analyzed and calculated by the microprocessor U1.

The receiving node unit of the CAN communication module is composed of the CAN communication receiver U13.

The system read-in program communication circuit is composed of the asynchronous serial communication processor U14, the communication port DB9, the electron switch U15, and others. The system failure code display circuit is composed of the register U16 and the 8-seg led DS to judge and compare the system failure information.

After the ionization sensor signal is processed by the constant potentiometer circuit and the current detection circuit, which are composed of the micro-power consumption operational amplifier U18, U17 and their external circuits, the potential of the sensor signal is controlled to a fixed value. After processing, the sensor signal is input into the pin P27 of the microprocessor, so that it can be analyzed and calculated by the microprocessor U1.

After the voltage signal is processed by the power detecting circuit composed of the phase locked loop U19, it is input into pin P26 of the microprocessor U1 via the photoelectric coupler OP3 to detect the battery voltage in real time, so that reliable and stable direct Power is supplied to the system.

After the headlamp switch signal, the idle gear position signal, the power-assisted steering signal, the air-condition requesting signal are converted to analog voltage signals by the series divider resistance to supply for the Schmitt trigger U20 for reshaping, the output digital signals in turn are input into the pin P21, P22, P23 and P24 of the microprocessor U1, so that the working status of the engine is determined and analyzed by the microprocessor U1.

After the rotational speed signal is adjusted by the time based circuit U21, it is input into pin P20 of the microprocessor U1 via the photoelectric coupler OP4, so that it can be analyzed and calculated by the microprocessor U1.

The cerebellum model arithmetic controller CMAC is composed of the microprocessor U24, the latch U22, the dynamic storage U23, under the control of the microprocessor U1, which adaptive learns according to the internal control strategy and adjustably approaches the target value of the air-fuel ratio. The dynamic storage U23 is a flash memory, which refreshes and stores the clustering adjust parameters, and participates the control of the controller under the new working status under the control of the microprocessor U24.

The reserved extended flash memory is composed of the extended interface U26 and the storage U25 to store the system MAP data.

FIG. 10 is the circuit of an embodiment associated with drivers in the control device for the engine provided by the present invention. Utilizing its I/O ports P70~P77, the microprocessor U1 controls the injection of the engine via the power driver tubes Q11-Q14 in real time after collection, feedback, analysis, determining and comparison of the injection signals via the switching value drivers U37 and U38.

The microprocessor U1 utilizes its I/O ports P120-P127 to output the control signals. After the signals are isolated by the anti-jamming circuit composed of the photoelectric couplers OP31-0P24, the switch values control of the fault indication-alarm switch, the injector switch of intake air resonant, the EGR electromagnetic valve switch and carbon canister electromagnetic valve switch is driven by the drive circuit composed of the power driver tubes BT12-BT15 after collection, feedback, analysis, determining and comparison of the signals via the switching value drivers U35 and U36.

Utilizing its I/O ports P30~P37, the microprocessor U1 performs real time control on the ignition of the engine via the power driver tubes BT8-BT11 after collection, feedback, analysis, determining and comparison of the ignition signals via the switching value drivers U33 and U34.

The microprocessor U1 utilizes its I/O ports P110-P111 to output the drive signals of the stepping motor and the electromagnetic valve. After the signals are isolated by the anti-jamming circuit composed of the photoelectric couplers OP22 and OP23, the operation of the stepping motor MG1 and the operation of the electromagnetic valve DJ1 are driven to control the intake flow via driving the triode, the H bridge circuit and the power driver QE1 circuit, respectively.

The microprocessor U1 utilizes its I/O ports P100-P107 to output the control signals. After the signals are isolated by the anti-jamming circuit composed of the photoelectric couplers OP14-OP21, the switch value is controlled by the drive circuit composed of the power drive tubes BT5-BT7 and the high power drive tube U32 after collection, feedback, analysis, determining and comparison of the signals via the switching value drivers U30 and U31.

After being isolated by the photoelectric coupler OP13, the driving control signals of the microprocessor U1 drive the power tube Q3 after they are amplified by the triode Q2 to control the high/low potential of the electric throttle valve. And then, after being processed by the current monitor circuit composed of the signal amplifier U29, the signals are input into the pin P46 of the ND port of the microprocessor U1 to monitor the current in real time and to be used for position feedback processing.

The microprocessor U1 utilizes its I/O port P150-P157 to output the control signals. After the signals are isolated by the anti-jamming circuit composed of the photoelectric coupler OP5-OP12, the standby switch value control is driven by the drive circuit composed of the power drive tubes BT1-BT4.

The PWM1, PWM2 control signals are output by the pins P130 and P131 of the microprocessor U1, respectively, go through the H-bridge drive circuit composed of the power driver Q15-Q18, and go through the rectifying isolating circuit composed of the zener rectifier diodes D11-D14, to drive and control the throttle valve motor MG2.

While the present invention has been described with reference to several typical embodiments, it should be understood that the terms used are illustrative but not restrictive. Since the present invention can be implemented in various detail forms without departing from the spirit and scope of the invention, it should be understood that the above embodiments are not limited to any detail described above, but should be extensively explained in the spirit and scope restricted by the appended claim. Therefore, all the changes and modifications falling into the scope of the claims or their equivalent scope should be embraced by the appended claims.

What is claimed is:

1. A control method for an engine, which is executed by a control unit in the engine, comprising the following steps:

determining current working status according to basic operation conditions and feature signal values of a plurality of sensors, generating expected target values for different targets of the engine under the current working status according to basic parameter maps, correcting the basic parameter maps, and controlling the different targets of the engine; which is characterized in that, during performing the control method for the engine, the control unit also executes the following steps:

step S1: adaptively learning actual target values fed back by the different targets of the engine and performing comparison and judgment for optimization between the adaptively learned actual target values and the basic parameter maps under the same working status and the same basic operation conditions; wherein, if a condition is not satisfied, the basic parameter maps are kept; and if the condition is satisfied, dynamic parameter maps are generated, and step S2: forming combined parameter maps from the basic parameter maps and the dynamic parameter maps, and replacing the basic parameter maps with the combined parameter maps; wherein the basic parameter maps are corrected according to a correction strategy, comprising the following steps:

correcting the basic parameter maps using the feature signal values of a plurality of associated sensors which reflect the current working status of the engine;

correcting the basic parameter maps using soft measuring feature signal values which are obtained by performing a soft measuring method with a new feature signal processing way of the associated sensors on the variables that can't be directly measured; and correcting the basic parameter maps using the feature signal values of the associated sensors which are adaptively learned by performing weighted value matching during the correction step between the expected target values and the actual target values;

wherein, the feature signals of the associated sensors comprise the signals of the associated sensors of the engine and the feature signals deduced using soft measuring way, including a crankshaft position and rotational speed signal of the engine, a top dead center signal, a torque signal, an injection pulse width signal, a throttle valve position signal, an oxygen sensor signal, a fuel temperature signal, a machine oil temperature signal, an environment pressure signal, a power supply loop voltage signal, a water temperature sensor signal, an exhaust temperature signal, an intake pressure signal, an air-fuel ratio signal, a knock signal, a flame conduction angle signal, frequency selection probability distribution of knock signals in several cycles, and probability of a flame transmitting angle signal exceeding time threshold.

2. A control method for an engine, which is executed by a control unit in the engine, comprising the following steps:

determining current working status according to basic operation conditions and feature signal values of a plurality of sensors, generating expected target values for different targets of the engine under the current working status according to basic parameter maps, correcting the basic parameter maps, and controlling the different targets of the engine; which is characterized in that, during performing the control method for the engine, the control unit also executes the following steps:

step S1: adaptively learning actual target values fed back by the different targets of the engine and performing comparison and judgment for optimization between the adaptively learned actual target values and the basic parameter maps under the same working status and the same basic operation conditions; wherein, if a condition is not satisfied, the basic parameter maps are kept; and if the condition is satisfied, dynamic parameter maps are generated, and step S2: forming combined parameter maps from the basic parameter maps and the dynamic parameter maps, and replacing the basic parameter maps with the combined parameter maps; wherein the dynamic parameter maps are generated according to the dynamic map generation strategy, comprising the following steps:

a. determining a dynamic map generation region: the basic parameter maps of a certain control target under the same working status and the same operation conditions and the various associated feature signal values that represent the working status and the operation conditions at the moment are taken as a data node; the corrected basic parameter map y of this node is taken as the central value; and the dynamic map generation region $(y-\Delta y, y+\Delta y)$ is generated with the difference between the expected control target value and the actual control target value as the basic reference radius;

b. determining a dynamic map optimization region in the generation region: in the spatial region of the same dimension, the dynamic map generation trend is judged based on the magnitude of the changing rates of the various associated feature signal values representing this working status in this data node to determine whether the smaller region is on the $(y-\Delta y)$ side or on the $(y+\Delta y)$ side; after the determination, the median of the $(y-\Delta y)$ or $(y+\Delta y)$ region is taken as the new node after target approaching, which is taken as the center to determine the new approached dynamic map generation region; this process repeats and continuously approaches the target until the minimum region $\min(y-\Delta y, y+\Delta y)$ appears as the optimization region;

c. generating a dynamic map: when the various associated feature signal values representing this working status tend to become a constant $\epsilon$ near zero, and the probability distribution of the associated feature signals after performing probability statistic processing is in the allowable range, the median point $y_m$ in $\min(y-\Delta y, y+\Delta y)$ is determined as the generated dynamic parameter map;

d. determining the dynamic map: the above processes a-c are repeated and experiential clustering is performed; when the changing rates $\epsilon$ of the various associated feature signal values and the probability distributions of the associated feature signals are stable in an allowable changing range, this dynamic parameter map is determined and stored in a ferroelectric memory; at the moment, the various associated feature signal values corresponding to the determined dynamic parameter map are a set of data nodes, and the set of data nodes are working status condition signals to determine the dynamic parameter map;

e. updating the dynamic map: due to the characteristic change of the engine and the usage environment change during the control process, the control targets of the generated dynamic map also change; during the a-d process taken on the composed data nodes, when the changing rates $\epsilon$ of these various associated feature signal values and the probability distributions of the associated feature signals are determined to be out of the allowable changing range, the new dynamic parameter map is regenerated, determined by experiential clustering, and then used to update the unit of the original data nodes addresses.

3. A control method for an engine, which is executed by a control unit in the engine, comprising the following steps:

determining current working status according to basic operation conditions and feature signal values of a plurality of sensors, generating expected target values for different targets of the engine under the current working status according to basic parameter maps, correcting the basic parameter maps, and controlling the different targets of the engine; which is characterized in that, during performing the control method for the engine, the control unit also executes the following steps:

step S1: adaptively learning actual target values fed back by the different targets of the engine and performing comparison and judgment for optimization between the adaptively learned actual target values and the basic parameter maps under the same working status and the same basic operation conditions; wherein, if a condition is not satisfied, the basic parameter maps are kept; and if the condition is satisfied, dynamic parameter maps are generated, and step S2: forming combined parameter maps from the basic parameter maps and the dynamic parameter maps, and replacing the basic parameter maps with the combined parameter maps; wherein the combined parameter maps are formed according to a dynamic map combination strategy in the step S2, comprising:

a. comparing the basic parameter maps and the generated dynamic parameter maps under the same working status and the same operation condition or under the same working status and very close operation conditions;

b. setting wholly or partly the dynamic parameter maps as the combined parameter maps of the engine according to the changing rates of the various associated feature signal values when the various associated feature signal values are same while the target parameters are different in the elements composing the data nodes, and shielding the corresponding basic parameter maps;

wherein, the step of the dynamic parameter maps being wholly or partly set as the combined parameter maps of the engine according to the changing rates of the various associated feature signal values comprises:

abandoning the dynamic parameter maps when the target is controlled by the determined dynamic parameter maps and the changing rates of the various associated feature signal values can't be stable in the allowable region, setting the basic parameter maps under the working status and the operation conditions as the combined parameter maps of the engine, and regenerating the dynamic parameter maps;

c. calculating respectively the changing rates of the different feature signal values according to the value of the previous cycle and the value of the current cycle value when the various associated feature signal values are not all the same while the target parameters are same, comparing the changing rates to take the minimum to judge the optimization, and determining the combined parameter maps which include whole or partial dynamic parameter maps.

4. A control device for an engine comprising:

a microprocessor, a power detecting and voltage stabilizing circuit, a communication interface CAN, LIN and external diagnosis circuit, a high-power drive circuit, a switching quantity drive circuit and a drive circuit, which are individually connected to the microprocessor; and, an input conditioning circuit, an input conditioning buffer circuit, analog signal channels and digital signal channels;

wherein a portion of analog signals from a plurality of sensors are transported to the microprocessor via the input conditioning circuit and the analog signal channels, while the other portion of analog signals from the sensors are transported to the microprocessor via the input conditioning circuit and the digital signal channels;

wherein digital signals from the sensors are transported to the microprocessor via the input conditioning buffer circuit and the digital signal channels; and wherein the microprocessor determines a current working status according to basic operation conditions, the analog signals and the digital signals; generates expected target values for different targets of the engine under the current working status according to basic parameter maps; and controls the different targets of the engine after the expected target values are corrected;

which is characterized in that, the control device for the engine further comprises:

a cerebellum model arithmetic controller CMAC which is connected to the microprocessor, and a ferroelectric memory which is connected to the cerebellum model arithmetic controller CMAC;

wherein the cerebellum model arithmetic controller CMAC is used to learn adaptively actual target values fed back by different targets of the engine during performing the control method, performs comparison and judgment for optimization between the adaptively learned actual target values and the basic parameter maps, and when a condition is satisfied, generates the new dynamic parameter maps and stores into the ferroelectric memory; and wherein the microprocessor forms combined parameter maps from the basic parameter maps and the dynamic parameter maps stored in the ferroelectric memory, and replaces the basic parameter maps with the combined parameter maps.

5. The control device for the engine according to claim 4, which is characterized in that:

the analog signals comprise an intake pressure or intake flowrate signal, a throttle valve position signal, an atmospheric pressure signal, an intake temperature signal, a cooling water temperature signal, an oxygen sensor signal, an environment temperature signal, an accelerator pedal signal and a system voltage variation signal;

the digital signals comprise a crankshaft position signal, an injection pulse width signal, a vehicle speed signal, a knock signal, an air-condition requesting signal, a power-assisted steering requesting signal, a neutral gear signal and a headlamp switch signal.

6. A control method for an engine, which is executed by a control unit in the engine, comprising the following steps:

determining current working status according to basic operation conditions and feature signal values of a plurality of sensors, generating expected target values for different targets of the engine under the current working status according to basic parameter maps, correcting the basic parameter maps, and controlling the different targets of the engine; which is characterized in that, during performing the control method for the engine, the control unit also executes the following steps:

step S1: adaptively learning actual target values fed back by the different targets of the engine and performing comparison and judgment for optimization between the adaptively learned actual target values and the basic parameter maps under the same working status and the same basic operation conditions; wherein, if a condition is not satisfied, the basic parameter maps are kept; and if the condition is satisfied, dynamic parameter maps are generated, and step S2: forming combined parameter maps from the basic parameter maps and the dynamic parameter maps, and replacing the basic parameter maps with the combined parameter maps;

wherein the combined parameter maps comprise combined ignition parameter maps of the engine, combined injection parameter maps of the engine, combined intake parameter maps of the engine, combined idle controlled parameter maps of the engine, combined EGR rate parameter maps, and combined ignition dwell angle parameter maps of the engine;

wherein the combined parameter maps are formed according to a dynamic map combination strategy in the step S2, comprising:

a. comparing the basic parameter maps and the generated dynamic parameter maps under the same working status and the same operation condition or under the same working status and very close operation conditions;

b. setting wholly or partly the dynamic parameter maps as the combined parameter maps of the engine according to the changing rates of the various associated feature signal values when the various associated feature signal values are same while the target parameters are different in the elements composing the data nodes, and shielding the corresponding basic parameter maps;

wherein, the step of the dynamic parameter maps being wholly or partly set as the combined parameter maps of the engine according to the changing rates of the various associated feature signal values comprises:

abandoning the dynamic parameter maps when the target is controlled by the determined dynamic parameter maps and the changing rates of the various associated feature signal values can't be stable in the allowable region, setting the basic parameter maps under the working status and the operation conditions as the combined parameter maps of the engine, and regenerating the dynamic parameter maps; and c. calculating respectively the changing rates of the different feature signal values according to the value of the previous cycle and the value of the current cycle value when the various associated feature signal values are not all the same while the target parameters are same, comparing the changing rates to take the minimum to judge the optimization, and determining the combined parameter maps which include whole or partial dynamic parameter maps.

7. The control device for the engine according to claim 4, which is characterized in that:

the current working status comprises a medium and low load working status, a heavy load working status, a starting working status, an acceleration-deceleration working status and an idle working status.

8. The control device for the engine according to claim 4, which is characterized in that:

the combined parameter maps comprise combined ignition parameter maps of the engine, combined injection parameter maps of the engine, combined intake parameter maps of the engine, combined idle controlled parameter maps of the engine, combined EGR rate parameter maps, and combined ignition dwell angle parameter maps of the engine.

9. The control device for the engine according to claim 4, which is characterized in that:

the basic parameter maps comprise first parameter maps calibrated by an engine testing bench and second parameter maps calibrated by the engine testing bench and path parameter optimization.

10. The control device for the engine according to claim 4, which is characterized in that, the microprocessor corrects the basic parameter maps according to a correction strategy, comprising:

correcting the basic parameter maps using the feature signal values of a plural of associated sensors which reflect the current working status of the engine;

correcting the basic parameter maps using soft measuring feature signal values which are obtained by performing a soft measuring method with a new feature signal processing way of the associated sensors on the variables that can't be directly measured; and correcting the basic parameter maps using the feature signal values of the associated sensors which are adaptively learned by performing weighted value matching during the correction step between the expected target values and the actual target values;

wherein, the feature signals of the associated sensors comprise the signals of the associated sensors of the engine and the feature signals deduced using soft measuring way, including a crankshaft position and rotational speed signal of the engine, a top dead center signal, a torque signal, an injection pulse width signal, a throttle valve position signal, an oxygen sensor signal, a fuel temperature signal, a machine oil temperature signal, an environment pressure signal, a power supply loop voltage signal, a water temperature sensor signal, an exhaust temperature signal, an intake pressure signal, an air-fuel ratio signal, a knock signal, a flame conduction angle signal, frequency selection probability distribution of knock signals in several cycles, and probability of a flame transmitting angle signal exceeding time threshold.

11. The control device for the engine according to claim 4, which is characterized in that, the cerebellum model arithmetic controller CMAC generates the dynamic parameter maps according to the dynamic map generation strategy, comprising:

a. determining a dynamic map generation region: the basic parameter maps of a certain control target under the same working status and the same operation conditions and the various associated feature signal values that represent the working status and the operation conditions at the moment are taken as a data node; the corrected basic parameter map y of this node is taken as the central value; and the dynamic map generation region $(y-\Delta y, y+\Delta y)$ is generated with the difference between the expected control target value and the actual control target value as the basic reference radius;

b. determining a dynamic map optimization region in the generation region: in the spatial region of the same dimension, the dynamic map generation trend is judged based on the magnitude of the changing rates of the various associated feature signal values representing this working status in this data node to determine whether the smaller region is on the $(y-\Delta y)$ side or on the $(y+\Delta y)$ side; after the determination, the median of the $(y-\Delta y)$ or $(y+\Delta y)$ region is taken as the new node after target approaching, which is taken as the center to determine the new approached dynamic map generation region;

this process repeats and continuously approaches the target until the minimum region $\min(y-\Delta y, y+\Delta y)$ appears as the optimization region;

c. generating a dynamic map: when the various associated feature signal values representing this working status tend to become a constant $\epsilon$ near zero, and the probability distribution of the associated feature signals after performing probability statistic processing is in the allowable range, the median point $y_m$ in $\min(y-\Delta y, y+\Delta y)$ is determined as the generated dynamic parameter map;

d. determining the dynamic map: the above processes a-c are repeated and experiential clustering is performed; when the changing rates $\epsilon$ of the various associated feature signal values and the probability distributions of the associated feature signals are stable in an allowable changing range, this dynamic parameter map is determined and stored in a ferroelectric memory; at the moment, the various associated feature signal values corresponding to the determined dynamic parameter map are a set of data nodes, and the set of data nodes are working status condition signals to determine the dynamic parameter map;

e. updating the dynamic map: due to the characteristic change of the engine and the usage environment change during the control process, the control targets of the generated dynamic map also change; during the a-d process taken on the composed data nodes, when the changing rates $\epsilon$ of these various associated feature signal values and the probability distributions of the associated feature signals are determined to be out of the allowable changing range, the new dynamic parameter map is regenerated, determined by experiential clustering, and then used to update the unit of the original data nodes addresses.

12. The control device for the engine according to claim 4, which is characterized in that, the microprocessor forms the combined parameter maps according to a dynamic map combination strategy, comprising:
   a. comparing the basic parameter maps and the generated dynamic parameter maps under the same working status and the same operation condition or under the same working status and very close operation conditions;
   b. setting wholly or partly the dynamic parameter maps as the combined parameter maps of the engine according to the changing rates of the various associated feature signal values when the various associated feature signal values are same while the target parameters are different in the elements composing the data nodes, and shielding the corresponding basic parameter maps;
   wherein, the step of the dynamic parameter maps being wholly or partly set as the combined parameter maps of the engine according to the changing rates of the various associated feature signal values comprises:
   abandoning the dynamic parameter maps when the target is controlled by the determined dynamic parameter maps and the changing rates of the various associated feature signal values can't be stable in the allowable region, setting the basic parameter maps under the working status and the operation conditions as the combined parameter maps of the engine, and regenerating the dynamic parameter maps;
   c. calculating respectively the changing rates of the different feature signal values according to the value of the previous cycle and the value of the current cycle value when the various associated feature signal values are not all the same while the target parameters are same, comparing the changing rates to take the minimum to judge the optimization, and determining the combined parameter maps which include whole or partial dynamic parameter maps.

13. The control device for the engine according to claim 8, which is characterized in that, the microprocessor forms the combined parameter maps according to a dynamic map combination strategy, comprising:
   a. comparing the basic parameter maps and the generated dynamic parameter maps under the same working status and the same operation condition or under the same working status and very close operation conditions;
   b. setting wholly or partly the dynamic parameter maps as the combined parameter maps of the engine according to the changing rates of the various associated feature signal values when the various associated feature signal values are same while the target parameters are different in the elements composing the data nodes, and shielding the corresponding basic parameter maps;
   wherein, the step of the dynamic parameter maps being wholly or partly set as the combined parameter maps of the engine according to the changing rates of the various associated feature signal values comprises:
   abandoning the dynamic parameter maps when the target is controlled by the determined dynamic parameter maps and the changing rates of the various associated feature signal values can't be stable in the allowable region, setting the basic parameter maps under the working status and the operation conditions as the combined parameter maps of the engine, and regenerating the dynamic parameter maps;
   c. calculating respectively the changing rates of the different feature signal values according to the value of the previous cycle and the value of the current cycle value when the various associated feature signal values are not all the same while the target parameters are same, comparing the changing rates to take the minimum to judge the optimization, and determining the combined parameter maps which include whole or partial dynamic parameter maps.

\* \* \* \* \*